United States Patent [19]
Bard et al.

[11] Patent Number: 5,422,469
[45] Date of Patent: Jun. 6, 1995

[54] FIBER OPTIC BARCODE READERS USING PURELY MECHANICAL SCANNER OSCILLATION

[75] Inventors: Simon Bard, Stony Brook; Howard Shepard, Great River, both of N.Y.

[73] Assignee: Symbol Technologies, Inc., Bohemia, N.Y.

[21] Appl. No.: 79,891

[22] Filed: Jun. 21, 1993

Related U.S. Application Data

[60] Continuation-in-part of Ser. No. 957,845, Oct. 8, 1992, abandoned, and a continuation-in-part of Ser. No. 885,645, May 19, 1992, Pat. No. 5,281,801, which is a division of Ser. No. 740,244, Aug. 5, 1991, Pat. No. 5,206,492, which is a division of Ser. No. 428,770, Oct. 30, 1989, Pat. No. 5,099,110.

[51] Int. Cl.$^6$ .............................................. G06K 7/10
[52] U.S. Cl. ................................... 235/462; 235/472; 235/473; 250/227.26
[58] Field of Search ............... 235/462, 467, 470, 472, 235/439, 453, 473; 250/227.26, 227.24, 221, 227.13

[56] References Cited

U.S. PATENT DOCUMENTS

| | | | |
|---|---|---|---|
| 3,449,587 | 8/1969 | Barnes | 250/227.26 |
| 3,508,814 | 4/1970 | Aas . | |
| 3,532,408 | 10/1970 | Dostal . | |
| 3,544,201 | 12/1970 | Fowler et al. . | |
| 3,610,891 | 10/1971 | Raciazek | 235/473 X |
| 3,614,677 | 10/1971 | Wilfinger . | |
| 3,668,633 | 6/1972 | Sadowsky | 250/227.26 X |
| 3,758,199 | 9/1973 | Thaxter . | |
| 3,794,410 | 2/1974 | Elliott . | |
| 3,902,783 | 9/1975 | Bodlaj . | |
| 3,978,318 | 8/1976 | Romeo et al. | 235/472 X |
| 3,981,566 | 9/1976 | Frank et al. . | |
| 4,025,203 | 5/1977 | Lee . | |
| 4,170,397 | 10/1979 | Botcherby et al. . | |
| 4,234,788 | 11/1980 | Palmer et al. | 250/227.26 |
| 4,251,798 | 2/1981 | Swartz et al. . | |
| 4,286,145 | 8/1981 | Palmer | 235/473 X |
| 4,387,297 | 6/1983 | Swartz et al. . | |
| 4,409,470 | 10/1983 | Shepard et al. . | |
| 4,436,364 | 3/1984 | Lauer et al. . | |
| 4,577,131 | 3/1986 | Soobitsky . | |
| 4,645,915 | 2/1987 | Van Ruyven . | |
| 4,708,420 | 11/1987 | Liddiard . | |
| 4,775,815 | 10/1988 | Heinz . | |
| 4,778,233 | 10/1988 | Christenson et al. . | |
| 4,847,490 | 7/1989 | Nishikama | 250/227.13 |
| 4,896,935 | 1/1990 | Lee . | |
| 4,923,281 | 5/1990 | Krichever et al. . | |
| 5,015,831 | 5/1991 | Eastman et al. . | |
| 5,028,769 | 7/1991 | Claypool et al. . | |
| 5,099,110 | 3/1992 | Shepard et al. | 235/467 X |
| 5,130,534 | 7/1992 | Gouirand | 250/227.26 X |
| 5,144,120 | 9/1992 | Krichever et al. . | |
| 5,191,197 | 3/1993 | Metlitsky et al. | 235/472 |
| 5,206,492 | 4/1993 | Shepard et al. | 235/470 X |
| 5,281,801 | 1/1994 | Shepard et al. | 235/462 X |
| 5,304,788 | 4/1994 | Metlitsky et al. | 235/472 |

FOREIGN PATENT DOCUMENTS

| | | | |
|---|---|---|---|
| 0264956 | 4/1988 | European Pat. Off. . | |
| 0197576 | 11/1983 | Japan | 235/472 |
| 1387091 | 3/1975 | United Kingdom . | |

OTHER PUBLICATIONS

IBM Technical Disclosure Bulletin, "Code Reading Mechanical Scanning Gun" by W. L. Grabowski & R. J. Wohl, vol. 5, No. 5, Oct., 1963, p. 78.

*Primary Examiner*—John Shepperd
*Attorney, Agent, or Firm*—Lowe, Price, LeBlanc & Becker

[57] ABSTRACT

The laser diode of an optical scanning system is located in a separate unit and light therefrom carried to a remote scan head via an optical fiber. This reduces the size and weight of the scan head and reduces the temperature sensitivity of the scan head. The scan head may include an optical sensor for detecting light reflected from scanned symbols. Alternatively, the separate unit may house the sensor, and the same fiber or an additional fiber will collect the reflected light and transmit that light back to the sensor. A portion of the optical fiber is attached to the optical scan unit such that the first end is free to vibrate within the optical scan unit in response to a mechanical force applied to the optical scan unit by a user, for example by shaking or striking the scan unit. In an alternative embodiment, a torsion spring arrangement supports the emitting end of the fiber, and a user activates a mechanical trigger or the like to initiate vibration of the spring and corresponding oscillation of the emitting end of the fiber.

33 Claims, 11 Drawing Sheets

FIBER OPTIC BARCODE READERS USING PURELY MECHANICAL SCANNER OSCILLATION

CROSS-REFERENCE TO RELATED APPLICATION

This application is a continuation-in-part of U.S. patent application Ser. No. 07/957,845, filed on Oct. 8, 1992, which is now abandoned.

This application is also a continuation-in-part of U.S. patent application Ser. No. 07/885,645, filed on May 19, 1992, which is now U.S. Pat. No. 5,281,801, which is a divisional of U.S. patent application Ser. No. 07/740,244, filed on Aug. 5, 1991, which is now U.S. Pat. No. 5,206,492, which in turn is a divisional of U.S. patent application Ser. No. 07/428,770, filed on Oct. 30, 1989, which now is U.S. Pat. No. 5,099,110, the disclosure of each application being herein incorporated by reference.

TECHNICAL FIELD

The present invention relates to optical scanners for optically reading information, such as bar codes. In particular, this invention relates to small light weight scanning structures using optical fibers.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and the disclosures of which are incorporated by reference herein—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector having a field of view extending across and slightly past the symbol detects light of variable intensity reflected off the symbol and generates electrical signals indicative of the detected light. A scanning component is situated in the flight path. The scanning component may either sweep the beam spot across the symbol and trace a scan line across and past the symbol, or scan the field of view of the photodetector, or do both.

A digitizer, associated with or included in the scanner, processes the analog signal from the photo detector to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This analysis may also include an "autodiscrimination" which is an initial recognition of the particular standard the scanned symbol conforms to. Typically, the various decoder functions are performed by a microprocessor, with associated program memory and random access data memory.

FIG. 7 illustrates an example of a prior art bar code reader unit 10 implemented as a gun shaped device, having a pistol-grip type of handle 53. A lightweight plastic housing 55 contains the laser light source 46, the detector 58, the optics and signal processing circuitry and the CPU 40, as well as a power source such as batteries 62. A light-transmissive window 56 in the front end of the housing 55 allows the outgoing light beam 51 to exit and the incoming reflected light 52 to enter. The reader 10 is designed to be aimed at a bar code symbol 70 by the user from a position in which the reader 10 is spaced from the symbol, i.e., not touching the symbol or moving across the symbol.

As further depicted in FIG. 7, a suitable single or multiple lens system 57 may be used to focus the scanned beam into a scanning spot at an appropriate reference plane. A light source 46, such as a semiconductor laser diode, introduces a light beam into the axis of the lens system 57, and the beam passes through a partially-silvered mirror 47 and other lenses or beam-shaping structure as needed. The beam is reflected from an oscillating mirror 59 which is coupled to a scanning motor 60 energized when the trigger 54 is pulled. The oscillation of the mirror 59 causes the reflected beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 52 reflected back by the symbol 70 passes back through the window 56 for application to the detector 58. In the exemplary reader 10 shown in FIG. 7, the reflected light reflects off of mirror 59 and partially-silvered mirror 47 and impacts on the light sensitive detector 58. The detector 58 produces an analog signal proportional to the intensity of the reflected light 52. This signal is processed and digitized by circuitry mounted on circuit board 61 and decoded by microprocessor 40.

To scan a symbol 70, a user aims the bar code reader unit 10 and operates movable trigger switch 54 to activate the light beam 51, the scanning motor 60 and the detector and decoding circuitry. If the scanning beam is visible, the operator can see the scan pattern on the surface on which the symbol 70 appears and adjust aiming of the reader 10 accordingly. If the light produced by the source 46 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The reader 10 may also function as a portable computer terminal. If so, the bar code reader 10 would include a keyboard 48 and a display 49, such as described in the previously noted U.S. Pat. No. 4,409,470.

In optical scanners of the type discussed above, the laser diode, the lens, the mirror and the means to oscillate the mirror all add size and weight to the handheld scanner. The photodetector and the associated processing circuitry also add size and weight. In applications involving protracted use, a large heavy handheld unit can produce fatigue. When use of the scanner produces fatigue or is in some other way inconvenient, the user is reluctant to operate the scanner. Any reluctance to consistently use the scanner to input the optically coded data defeats the data gathering purposes for which bar code systems are intended.

Thus, an ongoing objective of barcode reader development is to miniaturize the barcode reader as much as possible. The laser diode is a bulky item and typically requires a heat sink. The laser diode is becoming smaller, but it still is a rather large component of the scanner. The degree of miniaturization of a barcode scanner, therefore, is limited by the size of the laser diode and the associated means to oscillate the laser beam.

Published European Patent Application No. 264,956 discloses an optical code reader using an optical fiber. Specifically, EP 264,956 teaches mounting a laser light source in a floor unit and supplying light therefrom to a handheld scanning head via an optical fiber. A photodiode in the scanning head detects light reflected from the scanned code and provides a corresponding electrical signal via a cable to a calculation unit within the floor unit. The calculation unit processes the electrical signal to produce an electrical representation of the scanned code. In one specific embodiment, the sleeve retaining the emitting end of the fiber and an associated lens are mounted on a pivotally supported platform. Reciprocal movement of the platform about the pivot axis produces a scanning motion of the beam. The presence of the photodiode in the scan head and the specific means used to produce the necessary scan motion of the beam still add excess size and weight to the system, and thereby make that system unsuitable for protracted use in many situations.

From the above discussion of the state of the art, it becomes clear that a need still exists to further reduce the size and weight of the scan unit and to provide a particularly convenient scanner system. The mass of the moving components should be as low as possible to minimize the power required to produce the scanning movement and to facilitate operation at high scanning speeds.

DISCLOSURE OF THE INVENTION

Objectives

One objective of this invention is to provide an optical scanning head which is smaller and lighter weight, when held by an operator, and which is easier to manipulate to scan encoded data. Therefore, the scanning head should include as few components as is practical, and all components in the scan head should be as small and lightweight as possible.

To reduce weight and achieve a higher degree of miniaturization, it is a specific object of this invention to eliminate the laser diode, the mirror and the means oscillate the mirror to produce the scanning motion of the beam from the optical scan head manipulated by the operator.

Another objective is to eliminate the photodetector from the portion of the optical scanner system which is actually held and manipulated by the operator.

A further objective is to make whatever means in the scan head produce the beam scanning motion as light as possible.

Another objective is to use purely mechanical means to produce the beam scanning motion, to thereby reduce power consumption and to eliminate the cabling used to carry motive drive power to the scanning means in the scan head.

SUMMARY

Because a laser diode is a bulky item and typically requires a heat sink, the present invention eliminates the laser diode from the actual scanner unit and places the diode in a separate box. The invention then uses one or more optical fibers to carry light from the diode to the scanner unit. To further reduce the size and weight of the scan head, the invention also moves the detector to the separate box. The invention also uses a number of different systems for producing the scanning motion of the beam, each of which are designed to be particularly small and light weight.

A further advantage provided by the invention is that the scan head can operate in a hostile environment. A laser diode is quite sensitive to temperature. Since the invention locates the laser diode in the separate hosing, a fiber optic scan module can be introduced into a hostile environment without subjecting the sensitive diode to extreme temperatures.

In a first aspect, the invention is a system for reading optically encoded information including an optical scan unit, a separate unit and at least one optical fiber. The separate unit contains a light emitter, an optical detector and circuitry for analyzing signals from the optical detector. The optical fiber carries light from the emitter to the scan unit. The optical fiber also receives light reflected from scanned optically encoded information and carries the reflected light from the scan unit back to the optical detector within the separate unit. The optical reading system also includes means, within the scan head, for producing oscillatory movement of light from the emitter, as it emerges from the optical fiber, such that the light beam scans the optically encoded information.

The invention also encompasses a second system, for scanning optically encoded information. This second system includes an optical scan unit and a separate unit. The separate unit, in this system, contains a light emitter. An optical fiber connects between the optical scan unit and the separate unit. The optical fiber carries light from the emitter to the scan unit. A variety of different means within the optical scan unit may be used to produce oscillatory movement of light emerging from the free end of the optical fiber such that the resulting beam scans the optically encoded information. In one embodiment of the scanning system, the means for producing oscillatory motion comprise a lens, a flexible support for the lens and means for producing oscillatory movement of the lens to oscillate the light emerging from the first end of the fiber in a scanning pattern. Additional embodiments of the invention consist of a method and scanning systems wherein a component in the scan unit is oscillated or vibrated by purely mechanical means, in response to activation by an operator. The use of mechanical means to produce the beam oscillation eliminates the need for electromagnetic or piezoelectric means. In at least some cases, the mechanical means are smaller and lighter. Also, a need no longer exists to supply a drive signal to the optical scan unit. This reduces power requirements and eliminates one or more wires from the bundled connecting cable.

For example, in one further embodiment, a portion of the fiber at a distance from the first end is fixedly attached to the optical scan unit. The first end itself is free to vibrate within the optical scan unit in response to a mechanical force applied to the optical scan unit by a user, for example by shaking or tapping on the scan unit. This embodiment will typically include means, such as a bushing attached to the first end and a straight slot within which the bushing may move back and forth, to insure that the first end of the fiber moves in such a manner that the emitted light scans a desired pattern.

In another embodiment using mechanical means to produce the beam scanning motion, a torsion spring arrangement supports the emitting end of the fiber. In this embodiment, a user activates a mechanical trigger or the like to initiate vibration of the spring and corresponding oscillation of the first end of the fiber.

The different embodiments of the scanning system each may include an optical detector. The detector may be mounted in the scan unit for sensing light reflected from the optically encoded information, and a flexible cable then carries a signal from the optical detector from the scan unit back to circuitry for analyzing signals within the separate unit. Alternatively, the detector may be mounted in the separate unit and a fiber carries reflected light from the scan unit back to the detector.

Thus, the present invention locates the laser diode and analog and digital signal processing electronics, the batteries and any RF communication circuitry which might be used all in a separate housing unit. This housing unit may be mounted on the wrist, on the arm, on the belt or on the helmet of the user. A fiber coupled to a visible laser diode (VLD) within the housing transmits the light to the scan head. The free end of the fiber where focusing optics (lenses) could be attached is oscillated by mechanical means. Alternatively, the end of the fiber is fixed in the scan head, and the lens is separate from the end of the fiber. In such a case, a motion device moves the lens to produce the beam scanning pattern.

To detect the reflected light, the invention can use several different techniques. In one technique, a photosensor located in the scan head senses the reflected light and produces a sensing signal for transmission to the circuitry in the separate housing unit. The photosensor can be stationary or can move with the lens or fiber end.

In another specific embodiment, a second fiber or a set of additional fibers, pick up reflected light and carry it from the scan head to a photosensor in the separate housing unit. Additional optics, such as another lens may be used to collect the reflected light for transmission through the second fiber or set of additional fibers.

In a further specific embodiment the same fiber which carries light from the laser diode to the scan head can direct the reflected light from the scan head back to the sensor located inside the separate housing. This embodiment also uses a beam splitter inside the housing.

The invention significantly reduces the size of the scanner's beam transmitting and receiving part, thus allowing the construction of a miniature scan head which is small in size, lightweight and amenable to operation in hostile environments. The scan heads provided by the present invention can be mounted, worn or held by an operator in a wide range of positions to facilitate a wide range of practical bar code scanning applications. For example, with the separate unit worn on the user's belt or stored in a pocket, the operator could wear the scan head on a helmet or eye glasses, on an arm band or bracelet, on a ring on one of the operator's fingers, etc. Alternatively, the scan head could be incorporated into a computer tablet pen or other writing instrument, incorporated into a gooseneck scanner for scan-down applications, etc.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODES FOR CARRYING OUT THE INVENTION

As used in this specification and in the appended claims, the term "indicia" broadly encompasses not only symbol patterns composed of alternating bars and spaces of various widths as commonly referred to as bar code symbols, but also other one or two dimensional graphic patterns, as well as alphanumeric characters. In general, the term "indicia" may apply to any type of pattern or symbol which may be recognized or identified by scanning a light beam and detecting reflected or scattered light as a representation of variations in light reflectivity at various points of the pattern or symbol.

Figure 1:
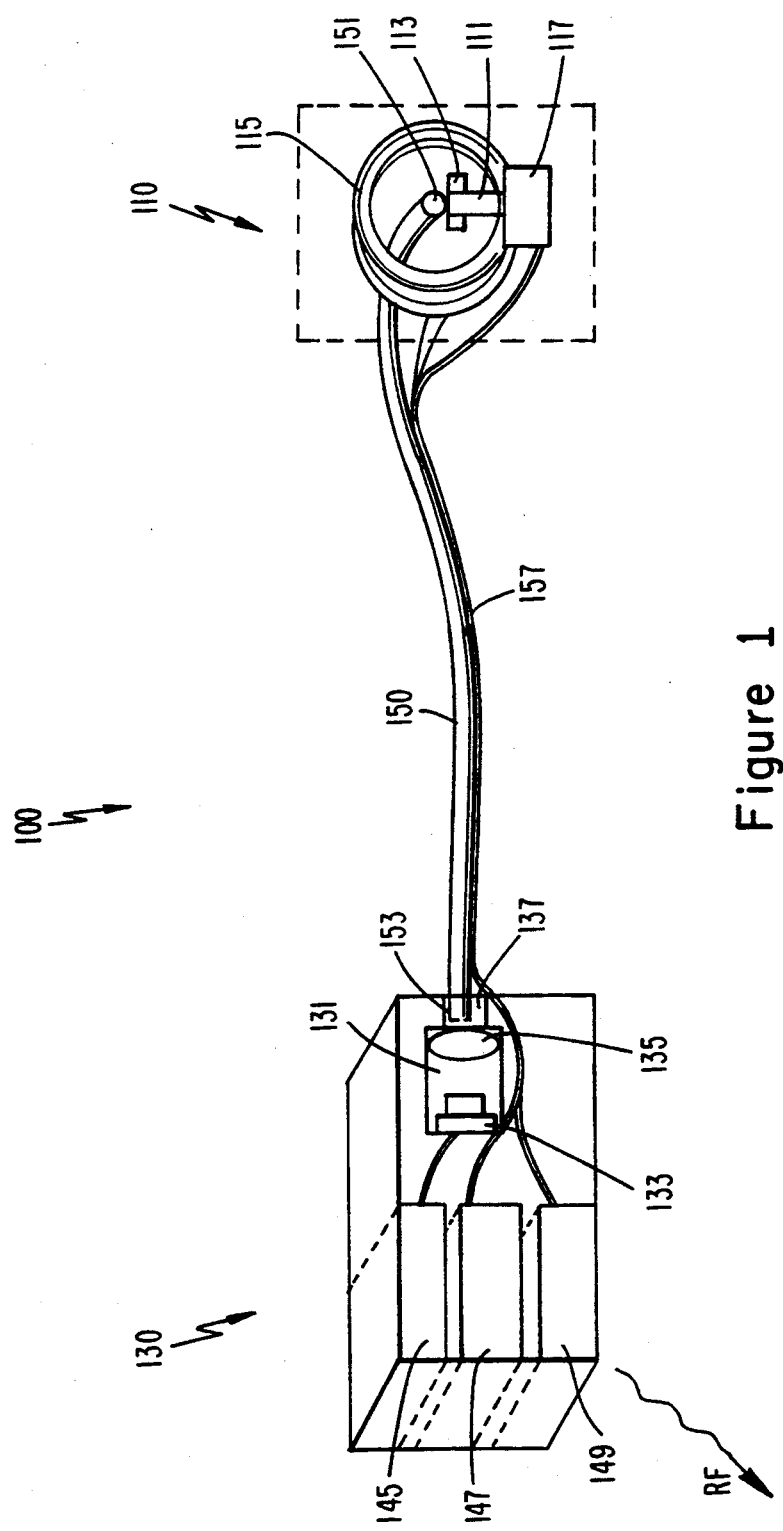
FIGS. 1 to 5 are diagrams showing five different embodiments of an optical scanning system using one or more optical fibers, in accord with the present invention.

In the first embodiment of the invention shown in FIG. 1, the scanning system 100 includes a scan head 110 and a separate box or unit 130 connected together by an optical fiber 150. A first end 151 of the fiber is located within the scan head, and a second end 153 of the fiber provides an optical connection to components within the separate housing 130. The scan head and the separate box are also connected by a multi-wire cable 157 bundled together with the fiber 150.

The separate unit 130 contains a light emitter for producing a beam of light for use in scanning optically encoded symbols, and other components which will be discussed later. In the preferred embodiment illustrated in FIG. 1, the light emitter is a visible laser diode (VLD) 133. A lens 135 focuses the beam from laser diode 133, as necessary, to prepare the beam for transmission through the fiber 150. Typically, the diode 133 and the lens are elements of a VLD assembly 131. An assembly of this type will typically include the laser diode, at least one lens element for focusing light from the diode and means to fix the lens element at a desired distance from the laser diode so as to produce a predetermined focal characteristic. Krichever et al., for example in their U.S. Pat. No. 4,923,281, disclose a module having two telescoping holding members and a biasing spring positioned between the laser diode and the lens assembly. One holding member is attached to the laser diode, and the other member holds the lens. The second holder also provides an aperture for the light passing through the lens. During actual focusing, the focusing module assembly is held in a jig which includes key or chuck elements to engage notches or keyways defining the orientation of the laser beam, lens and aperture as the two holding numbers are gradually telescoped together. As soon as the desired focus is achieved, the two holders are permanently fixed relative to one another by using adhesives such as glue or epoxy, or by fastening such as by staking, spot-welding, ultrasonic welding, or the like.

A mechanical/optical coupling device 137 is positioned adjacent the lens 135 and aperture of the VLD assembly 131. The device 137 provides physical support for the second end 150 of the fiber at an appropriate position to receive the beam. The coupling device 137 may also include optical means, such as an additional lens, to provide efficient coupling of the light from the VLD assembly 131 into the transmitting optical fiber 150. The fiber 150 typically is a single mode optical fiber 3-4 feet in length. The fiber is quite flexible and allows considerable movement of the scan head by the operator. The fiber 150 carries the light beam from the coupling device 137 in the separate box 130 to the scan head 110.

The fiber will be permanently connected to the scan head 110. Typically, the scan head will include a housing, illustrated by the dotted line around the components of the scan head in FIG. 1. The fiber 150 will pass through the rear of the housing and may be fixed at that point. In the embodiment of FIG. 1, the first end 151 of the optical fiber 150 is a "free" end in that it is not held in a stationary position, and the second end 153 is a "fixed" end of the fiber 150. A lens or other optical focusing element (not shown) may be formed on or attached to the actual light emitting surface at the first end 151 of the optical fiber for movement therewith.

The first end 151 of the fiber is mounted on a flexible strip 111. The combination of the flexibility of the free end of the fiber with respect to fixed point at the rear of the housing and the flexibility of the strip permit reciprocal motion of the end 151 of the fiber in one direction (horizontal in FIG. 1). The combination of the fiber and flexible support should prevent motion in other directions (e.g. vertical and front to back in FIG. 1). Alternatively, the flexible support structure can include a flexible strip extending across the opening through the coil (see FIG. 3). In the preferred form, the flexible strip(s) comprise Mylar TM or Kapton TM film, but other flexible elements could be used such as a flat strip of non-magnetic metal like a beryllium-copper alloy.

The fiber can be fixed to the scan head housing or some other point relatively far from the flex, and the free first end 151 of the fiber need not extend beyond the flex 111. Alternatively, the fiber could be fixed within the scan head at a point close to the flex, but such an arrangement may produce too much tension on the fiber in the region between the fixed point and the connection to the flex 111.

As shown, the first end 151 of the fiber is attached to the moveable end of the flexible strip 111, and the opposite end of the strip 111 is attached to a fixed support point, for example on the scan head housing or to the coil 115. Twisting of the flexible strip 111 therefore causes the first end 151 of the fiber to rotate laterally. The fiber end is laterally rotated back and forth in response to a motive force. This oscillation of the fiber end during emission of light by the light emitter causes the light emitted from the fiber to scan a surface, such as a surface bearing a bar code or other optically encoded indicia.

In the embodiment of FIG. 1, the coil 115 and permanent magnet 113 produce the necessary motive force. The permanent magnet 113 is glued or otherwise attached to the moveable end of the flexible strip 111, and the first end 151 of the fiber is similarly attached to the magnet 113 and/or to the movable end of strip 111. As shown, the coil 115 is essentially concentric about the rest position of the first end 151 of the fiber. An alternating current signal drives the coil. The magnetic field produced by coil 115 generates a torque on the permanent magnet 113 causing the magnet to oscillate, as described in more detail below. A laser beam from the VLD assembly 131 passes through the fiber 150 and is deflected by the oscillation of the first end 151 of the fiber which is attached to the oscillating permanent magnet. When there is no current through the coil 115, the resilient nature of the fiber and the flexible strip causes the "free" end of the fiber 150 to return to its central rest position, i.e. facing straight forward.

The permanent magnet 113 is aligned so that the axis between its north and south poles is perpendicular to the axis of coil 115. For example, the axis of magnet 113 could be parallel to or within the plane of FIG. 1, and the axis of the coil would be perpendicular to the plane of the Figure. When a current is introduced through the coil 115, interaction between magnetic fields of the coil and the permanent magnet 113 creates a torque causing the magnet 113 (with the attached end 151 of the fiber) to move from an equilibrium position. With the concentric arrangement illustrated in FIG. 1, this interaction of the magnetic field of the coil with that of the permanent magnet creates torque tending to force the axis of magnet 113 in line with the axis of coil 115. This torque causes the flexible strip 111 supporting the free end 151 of the fiber to twist and produce a return force. As a result of such motion, a return force is also produced by the fiber. These return forces are trying to bring the permanent magnet 113 and the end of the fiber back to the rest position. Reversing the polarity of the applied current will reverse the directions of the magnetic force. Therefore, if the current applied to the coil takes the form of a cyclical AC signal, such as a sine wave, a pulse signal, a triangular wave, etc., the induced magnetic forces will produce an oscillatory movement of the permanent magnet 113 and the attached free end 151 of the fiber. The flexible strip(s) twist back and forth causing the end of the fiber to oscillate.

The laser beam emitted from the oscillating free first end 151 of the fiber 150 produces a scan line. If the axis of coil 115 is perpendicular to the plane of the drawing and the axis of the magnet 113 is in the plane of the drawing, the resultant scan line would be horizontal in a plane approximately parallel to the plane of FIG. 1.

In the embodiment of FIG. 1, the scan head 110 includes an optical sensor 117. Typically, sensor 117 is a photodetector, such as a photodiode, positioned to receive light reflected from a symbol scanned by the beam emitted from the first end 151 of the optical fiber. The optical sensor 117 produces an electrical signal having an amplitude proportional to the intensity of the reflected light. Since the intensity of the reflected light varies as a function of the light reflectivity of the scanned symbol, the variations in signal amplitude also corresponds to the information encoded as elements of the symbol of different light reflectivity, such as the bars and spaces of a bar code symbol.

A long flexible multi-wire cable 157 connects the scan head unit 110 with the circuitry within the separate housing 130. The cable carries drive current from the drive signal generator 147 within the separate housing 130 to the coil 115. The cable 157 also carries the electrical signal from the sensor 117 to the processing circuitry 149 within the separate housing 130. The scan head may include an amplifier for increasing the power of the electrical signal from the optical sensor 117 to a level sufficient to permit transmission via the cable to the processing circuitry in the separate housing 130. The flexible cable is approximately the same length as the optical fiber 150 and typically will be joined together with the fiber to form a single cable/fiber bundle connecting the scan head 110 to the separate unit 130.

The processing circuitry 149 within the separate housing 130 includes the amplification stages, digitizer, etc. for processing the electrical signal from sensor 117, and the housing contains the AC drive signal generator 147 which produces the AC signal to drive the coil 115. The separate container 130 also houses the power supply circuitry 145 needed to power the VLD 133 and to provide power for the other circuit elements of the system 100. For example, the electronics in the unit 130 might include the processing circuitry provided by a circuit board for a standard LS-2000 scanner manufactured by Symbol Technologies, Inc. The separate unit 130 is small enough to be carried in a user's pocket, or worn on the user's belt, etc.

Figure 3:
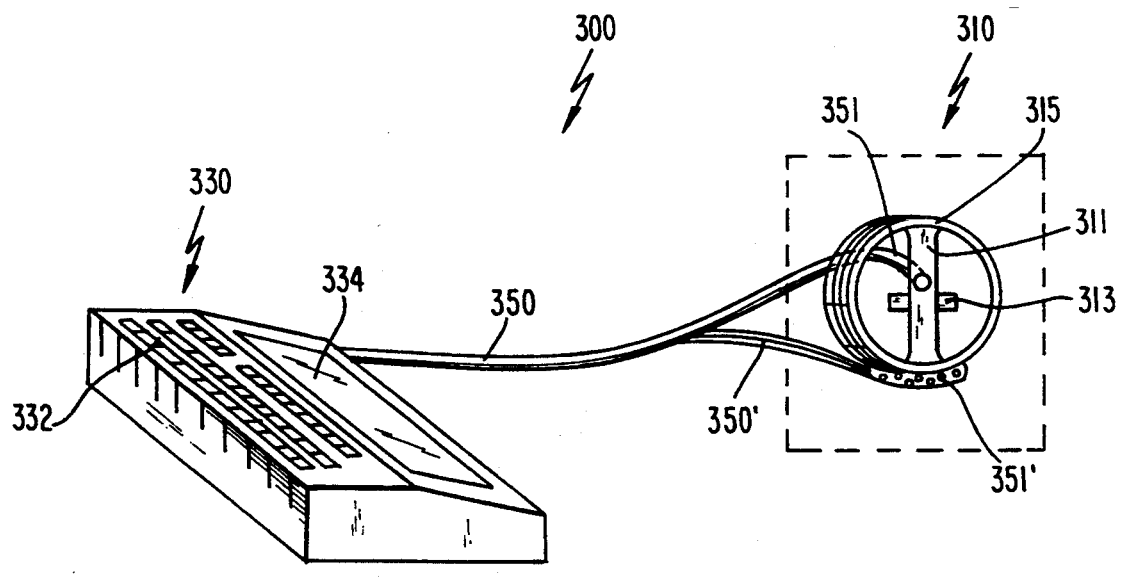

The separate box 130 can further accommodate a complete decoder with the battery power supply (LS85000 type by Symbol Technologies, Inc.) or even a keyboard and display to make a system not only "hands-free" but "location free" as well (see unit 330 in FIG. 3). Some extra devices can be incorporated in the box 130, for example a memory unit (units), an infrared or RF (radio frequency) transmitter for wireless communication with a remote host computer, or the like. This makes the entire device portable and "motion free," such that during scanning the scanning system 100 need not be connected by any physical means to the cash register, computer, etc. which will ultimately process the scanned bar code data.

Figure 2:
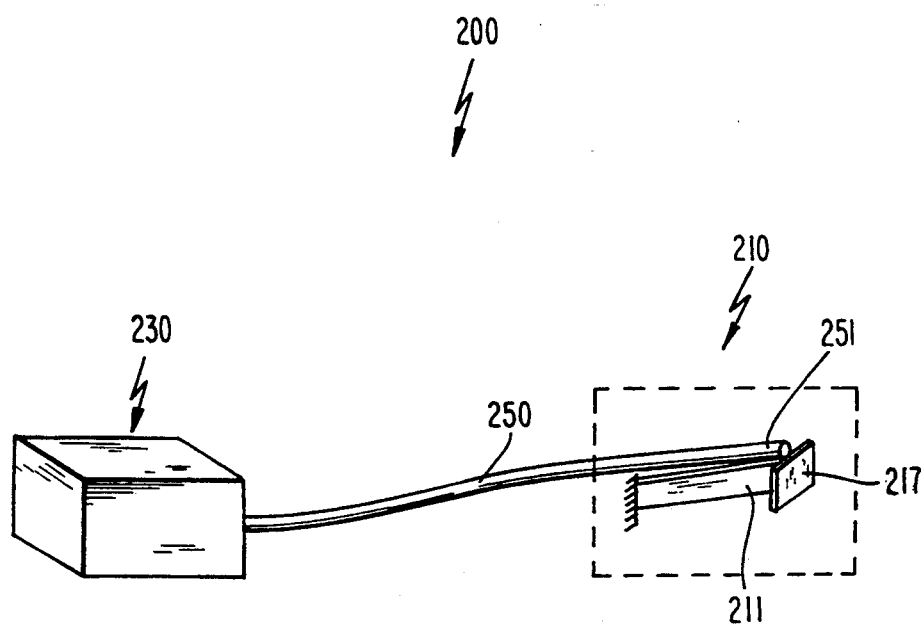

In the second embodiment, shown in FIG. 2, the scanning system 200 includes a scan head 210 and a separate box or unit 230 connected by an optical fiber 250. A first end 251 of the fiber is located within the scan head, and a second end of the fiber provides an optical connection to components in the separate housing 230. The scan head and the separate box are also connected by a multi-wire cable (not shown) bundled together with the fiber 150. The embodiment of FIG. 2 differs from the first embodiment principally in that a piezoelectric element 211 provides flexible support for the free end 251 of the fiber and produces the scanning motion.

Because of the inverse piezoelectric effect, if an electric signal is applied, the piezoelectric material changes physical size, i.e., expands or contracts, depending on the polarity of the applied voltage. The change, however, is very small. The relative change or strain is inversely proportional to the thickness of the piezoelectric material. To produce the effect, hundreds of volts are required but a very low current. The voltage can be DC.

A piezoelectric element includes two (bimorph) or more (multi-morph) piezoelectric layers of opposite polarization bonded together. When one layer shrinks under an applied voltage, the oppositely polarized layer expands. Thus when voltage is applied, the piezoelectric element will bend. If an opposite polarity voltage is applied, the piezoelectric element bends in the opposite direction. Therefore, application of a cyclically alternating voltage causes the piezoelectric element to repeatedly bend back and forth.

In the embodiment of FIG. 2, the free first end 251 of the optical fiber is attached to the moveable end of the piezoelectric element 211. The opposite end of the piezoelectric element 211 is fixed at a point within the housing of the scan head 210. A high voltage, low current AC signal applied to the piezoelectric element 211 causes the element to bend back and forth and the moveable end of the element 211 to reciprocate through an arc defined by the length of the element 211. This reciprocal bending of the element 211 causes the attached free end of the optical fiber to reciprocate. If a lens or other focusing element (not shown) is attached to the light emitting surface of the free end of the fiber, the reciprocation of the piezoelectric element 211 also reciprocates the lens.

The scan head 210 also includes a sensor 217 similar to the sensor in the previous embodiment. The optical sensor 217 produces an electrical signal having an amplitude corresponding to the variations in light reflectivity of the symbol scanned by the beam from the optical fiber 250. Sensor 217 can be fixedly mounted within the housing of the scan head 210, as in the first embodiment. The piezoelectric element 211, however, produces strong reciprocal forces and can actually carry the sensor 217 as well as the free end 251 of the fiber, as shown in the drawing.

A long flexible multi-wire cable (not shown) connects the scan head unit 210 with the circuitry mounted inside the separate container 230. The cable carries drive current from the circuitry within the separate housing 230 to the piezoelectric element 211. The cable also carries the electrical signal from the sensor 217 to the processing circuitry within the separate housing 230. The scan head may include an amplifier for increasing the power of the electrical signal from the optical sensor 217 to a level sufficient to permit transmission via the cable to the processing circuitry in the separate housing 230. The circuitry in the separate container 130 is essentially the same as that inside the box 130 in the first embodiment except that the AC signal generator which produces the drive signal produces a high voltage low current signal appropriate for driving the piezoelectric element 211.

FIG. 3 illustrates a scanning system 300 having a scan head 310 connected to a separate terminal housing device 330 via a bundle of optical fibers 350. A first end of the fibers connects to the scan head 310, and a second end of the fibers connects to the separate housing 330.

The separate box 330 includes the VLD assembly, AC drive signal generator and processing circuitry as discussed above with regard to FIG. 1. In the third embodiment, the separate housing 330 includes the additional components necessary to serve as a data input and display terminal. For example, the terminal 330 can further include a keyboard 332, a display 334 and the associated circuitry for allowing input of data via the keyboard and output of data via the display.

The scan head 310 includes a flexible support structure 311, permanent magnet 313 and coil 315. A free first end 351 of one of the optical fibers from bundle 350 connects to the flex 311. The flexible support structure 311, magnet 313 and coil 315 function essentially the same as the flexible strip, magnet and coil arrangement of FIG. 1. One difference, however, should be noted. The flexible support structure 311 extends entirely across the diameter of the coil 315, with the free end 351 of the fiber attached in the center. The flexible support structure 311 typically is a single flat flexible strip extending across the opening with a hole in the middle to accommodate the free first end of the fiber. The strip forming the flexible support structure 311 comprise Mylar TM or Kapton TM film strip(s), etc., as discussed above with regard to flexible member 111.

In the embodiment of FIG. 1, the single flexible strip 111 would need to be rather thick to provide sufficient support to prevent lateral movement or sagging due to the weight of the fiber and the attached permanent magnet. A thick flexible member, however, tends to be stiff and the resultant structure can not operate at low frequencies. In contrast, the structure of flexible support structure 311 shown in FIG. 3 provides increased vertical support and thereby eliminates sagging. Also, although the flexible support structure 311 can twist about a vertical axis, the connection across the opening substantially eliminates bending in either the lateral direction or in a direction from front to back. As a result, the strip or strips used to construct flexible support structure 311 can be relatively thin. Consequently, the flexible support structure 311 is not as stiff and operates quite well at low oscillation frequencies.

The embodiment of FIG. 3 is the first of several preferred embodiments wherein the optical sensor has been moved from the scan head to the separate housing unit. In FIG. 3, the first ends 351' of the other fibers 350' in the bundle 350 are fixed to the coil 315 or some other point in the front of the housing of the scan head 310. These other fibers 350' of the fiber optic bundle serve as return fibers. The return fibers 350' receive light reflected from scanned symbols and transmit that light back to an optical sensor (not shown) located together with and connected directly to the processing circuitry in the separate housing 330. Typically, a coupling member will provide an optical connection from these return fibers 350' to a photodiode, which then produces the signal related to the reflectivity of the scanned symbols in the usual manner. The scan head 310 may also include collective optics, such as one or more lenses, to collect light reflected from scanned symbols and apply that light to the first ends 351' of the return fibers 350'.

The elimination of the optical sensor from the scan head further reduces the size of the scan head and eliminates the weight of the sensor from the scan head. This modification also eliminates the weight of any amplifier which previous embodiments might have needed in the scan head to amplify the sensor signal prior to transmission to the processing circuitry in the separate housing unit. A flexible cable is still required to carry signals between the housing 330 and the scan head 310. This cable however only carries the AC drive current for the coil 315.

Figure 4:
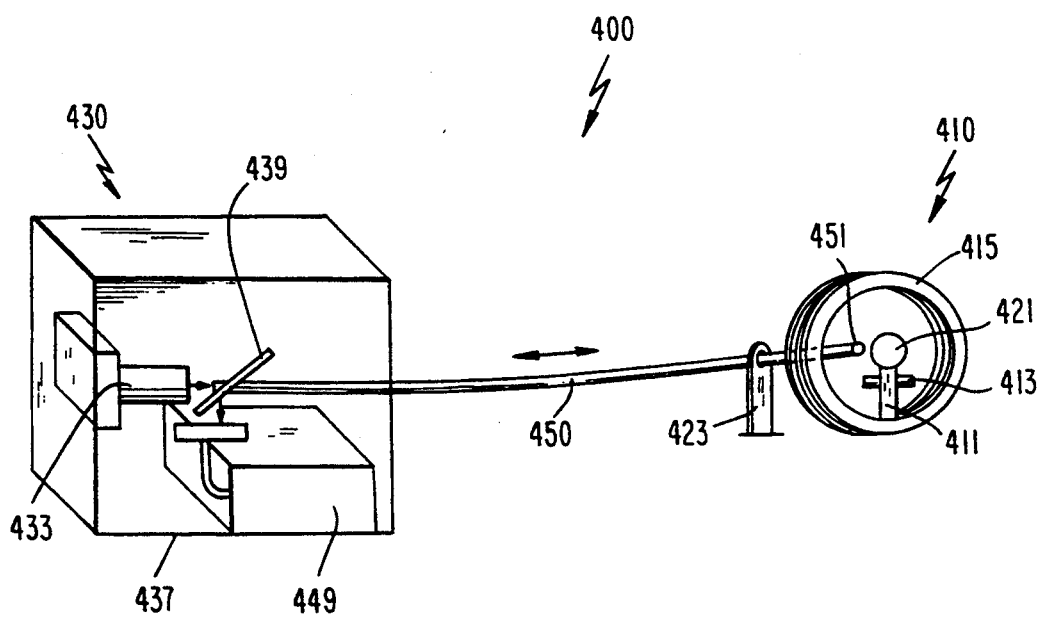

FIG. 4 shows a scanning system 400 which uses a single fiber 450 to carry the laser beam to the scan head 410 and to carry the light reflected from the symbol from the scan head 410 back to the processing circuitry in the separate housing unit 430.

In the embodiment of FIG. 4, a holder 423 within the housing of the scan head 410 fixedly supports the first end 451 of the optical fiber 450 in a stationary position. A lens 421 is located adjacent the end face of the fiber. The lens 421 is mounted on a flexible strip 411. The flexible strip can extend from one side of the coil 415 to the center of the opening within the coil, as shown, or the flexible strip can extend entirely across the opening, as in FIG. 3.

As shown, the lens 421 is attached to the moveable end of the flexible strip 411, and the opposite end of the strip 411 is attached to a fixed support point, for example a point on the scan head housing or the coil 415. The flexible strip 411 supports that lens in front of the first end 451 of the fiber. Twisting of the flexible strip 411 causes the lens 421 to rotate laterally. The permanent magnet 413 is glued or otherwise attached to the objective lens 421 and/or to the moveable end of the flexible strip 411. As shown, the coil 415 is essentially concentric about the rest position of the lens and the first end 451 of the fiber. The permanent magnet 413 is aligned so that the axis between its north and south poles is perpendicular to the axis of coil 415. For example, the axis of magnet 413 could be parallel to the plane of FIG. 4, and the axis of the coil would be perpendicular to the plane of the drawing.

When a current is introduced through the coil 415, interaction between magnetic fields of the coil and the permanent magnet 413 creates a torque causing the magnet 413 (with the attached objective lens 421) to move from an equilibrium position. With the concentric arrangement illustrated in FIG. 4, this interaction of the magnetic field of the coil with that of the cylindrical permanent magnet creates torque tending to force the axis of magnet 413 in line with the axis of coil 415. This torque causes the flex 411 supporting the lens 421 to twist and produce a return force which is trying to bring the permanent magnet 413 and lens back to the rest position. Reversing the polarity of the applied current will reverse the directions of the magnetic force. Therefore, if the current applied to the coil takes the form of a cyclical AC signal, such as a sine wave, a pulse signal, a triangular wave, etc., the induced magnetic forces will produce an oscillatory movement of the permanent magnet 413 and the attached objective lens 421 twisting the flexible strip(s) back and forth. A flexible cable (not shown) is connected between the housing 430 and the scan head 410 and carries the AC drive current for the coil 415.

The laser beam emitted from the first end 451 of the fiber 450 passes through the oscillating objective lens 421, and the oscillatory rotation of the lens produces a scan line. If the axis of coil 415 is perpendicular to the plane of the drawing and the axis of the magnet 413 is in the plane of the drawing, the resultant scan line would be horizontal in a plane approximately parallel to the plane of FIG. 4.

As the beam scans a symbol, the symbol will reflect light back to the scan head 410. The lens 421 also serves a collecting function. Specifically, as the lens oscillates, the lens will collect reflected light and apply that light to the first end 451 of the optical fiber 450. The fiber 450 thus also serves as a return fiber by receiving light reflected from scanned symbols and transmitting that light back to the separate housing 430.

Within the housing 430, the reflected light from fiber 450 is applied to a beam splitter 439. Light from the laser diode 433 is applied to the other side of the beam splitter 439. The beam splitter couples light emitted from the laser diode 433 to the optical fiber 450 for transmission to the scan head 410 and emission through the oscillating lens, as discussed above. The beam splitter 439 also splits out the reflected light from the fiber 450 and applies that light to an optical sensor 437 within the housing 430. Again, the sensor is typically a photodiode which then produces the signal related to the reflectivity of the scanned symbols in the usual manner for analysis by the processing circuitry 449. The other components within the separate housing 430 are essentially the same as in the earlier embodiments.

Figure 5:
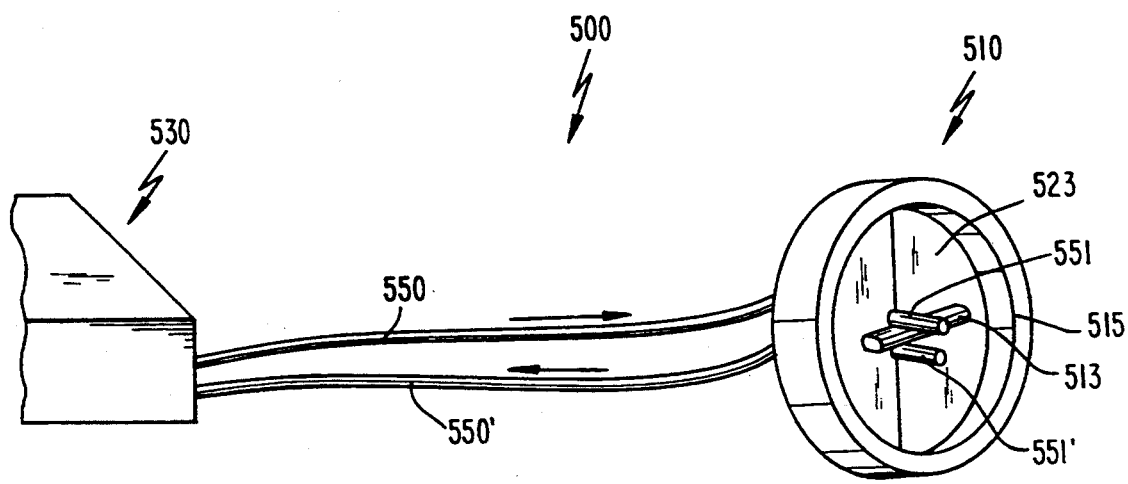

FIG. 5 shows an optical scanning system 500 which uses two optical fibers 550, 550' between the scan head 510 and the separate housing unit 530. The system 500 also relies on the flexibility of the optical fibers to eliminate the need for a flexible support member.

In the embodiment of FIG. 5, the separate housing 530 contains the VLD, the power supply, the drive signal generator, and the processing circuitry, as in the earlier embodiments. The separate unit 530 also contains an optical sensor directly connected to the processing circuitry, as in the embodiments of FIGS. 3 and 4.

In the embodiment of FIG. 5, a base 523 is mounted within the housing of the scan head 510 at a point close to or across the rear opening of the coil 551. The first end 551 of the transmitting fiber 550 and the first end 551' of the return fiber 550' pass through openings in the base 523. The fibers 550 and 550' are fixed within the openings through the base 523, but the ends 551 and 551' of the fibers extend sufficiently past the base to be flexible. The ends 551 and 551' of the fibers are aligned one above the other with a permanent magnet 515 attached in between them.

Scanning members need rigidity in all directions except for the direction in which the member is to reciprocate to produce the desired scanning motion. If the scanning support structure is not sufficiently rigid in the non-scanning directions, fringe magnetic fields will cause undesired movement in other directions, disrupting the scan pattern. Hence the embodiment of FIG. 1 used a thick flexible support, and the embodiment of FIG. 3 used a flex system which extended entirely across the opening through the coil structure. In the embodiment of FIG. 5, the vertical alignment of the fiber ends 551 and 551' and attachment to each other through the magnet produces a "flat" pair configuration which exhibits considerable rigidity in the vertical direction. Such a structure will prevent sagging of the fiber ends, without requiring any vertical support structure.

A flexible cable connected between the housing 530 and the scan head 510 carries the AC drive current for the coil 515. As shown, the coil 515 is essentially concentric about the rest position of the first end 551 of the transmitting fiber 550. The permanent magnet 513 is aligned so that the axis between its north and south poles is perpendicular to the axis of coil 515. When a current is introduced through the coil 515, interaction between magnetic fields of the coil and the permanent magnet 513 creates a force causing the magnet 513 (with the attached ends of the fiber) to move from an equilibrium position. With the concentric arrangement illustrated in FIG. 5, this interaction of the magnetic field of the coil with that of the cylindrical permanent magnet creates torque tending to force the axis of magnet 513 in line with the axis of coil 515. This torque causes the first ends 551 and 551' to bend and produce a return force which is trying to bring the permanent magnet 513 and fiber ends back to the rest position. Reversing the polarity of the applied current will reverse the directions of the magnetic force. Thus, application of the cyclical AC drive signal to the coil 515 produces magnetic forces which will cause reciprocation of the permanent magnet 513 and the attached fiber ends 551, 551'. As light from the VLD passes through the transmission fiber 550, the laser beam emitted from the reciprocating first end 551 of the fiber 550 produces a scan line.

As the beam scans a symbol, the symbol will reflect light back to the scan head 510. As the end 551' of the return fiber 550' reciprocates, the end 551' will collect the reflected light. The fiber 550' thus receives the light reflected from scanned symbols and transmits that light back to the separate housing 530. Within the housing 430, the reflected light from the return fiber 550' is applied to the optical sensor (not shown) located with and connected to the processing circuitry in the separate housing 530. The optical sensor produces the signal related to the reflectivity of the scanned symbols which is processed in the usual manner.

A lens (not shown) may be formed on or attached to the actual light emitting surface at the first end 551 of the transmitting optical fiber 550, to provide focusing of the scanning beam at an appropriate range from the scan head 310. Similarly, a lens (not shown) may be formed on or attached to the actual light receiving surface at the first end 551' of the return fiber 550', to collect light reflected from the scanned symbols.

Although not specifically shown, the scanning systems of FIGS. 1 to 5 typically include a manually activated trigger switch. The trigger activates the power supply, the light emitter, the drive signal generator, the processing circuitry, etc. to activate beam generation, scanning and reflected light detection. Use of the trigger conserves power by powering down the system components when not actually used for scanning.

Figure 6A:
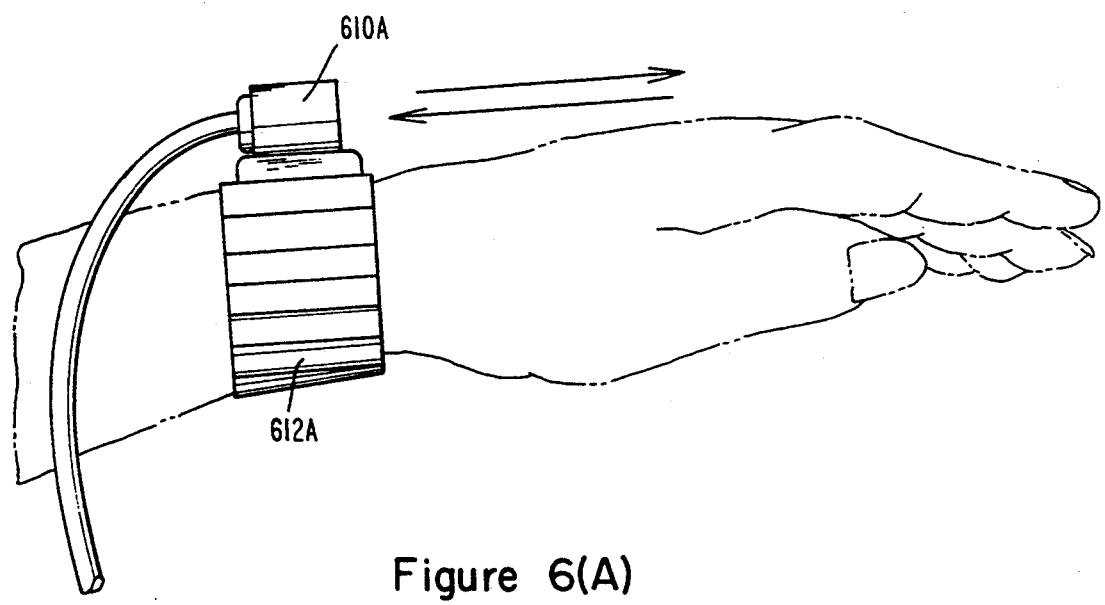
FIGS. 6A to 6D show various arrangements for mounting the scan head.
Figure 6B:
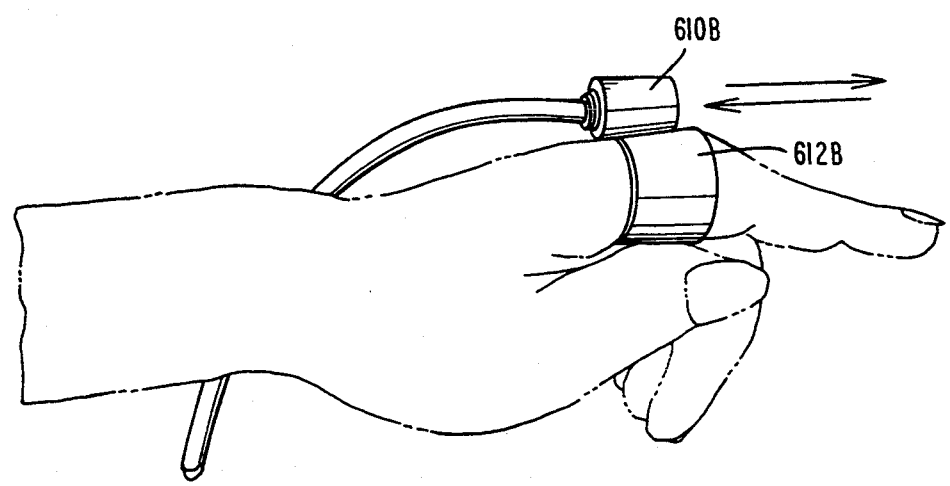

The scanning systems of the above-discussed embodiments would be operated by aiming the scan head at a symbol and activating the trigger, in a manner similar to the operation of the prior art device of FIG. 1. Because of the small size, light weight and insensitivity to temperature of the scan head, however, any of the scan heads of the present invention can be mounted, worn or held by an operator in a wide range of positions. For example, with the separate unit worn on the user's belt or stored in a pocket, the operator could wear the scan head on a helmet or eye glasses, etc. FIG. 6(A) shows mounting of a scan head 610A on an arm band or bracelet 612A, to permit the operator to wear the scan head in a manner similar to a wrist watch. FIG. 6(B) shows mounting of a scan head 610B on a ring 612B worn on one of the operator's fingers. The position can be selected to maximize comfort and convenience for the operator in view of the various functions the operator performs. The trigger switch also can be located at whatever point is most convenient, for example on the scan head, on the separate unit or at some other desirable point where it is easy to operate.

Further examples of the variety of types of systems which can use the present scanning system include pens and gooseneck scanners, as discussed below.

Figure 6C:
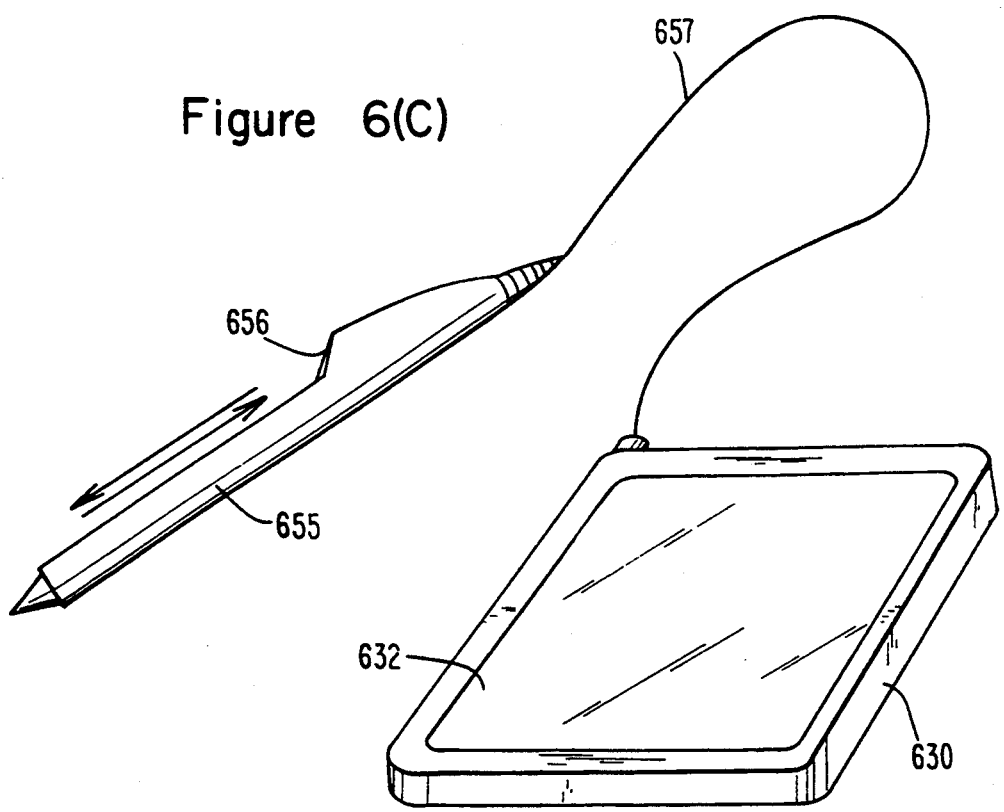

FIG. 6(C) shows an electronic tablet type computer input system wherein the writing stylus or pen includes a scan head in accord with the present invention. In the illustrated embodiment, the tip end of the pen would include the necessary stylus electronics, and the scan head would be mounted in the enlarged rear section of the stylus housing 655. A light-transmissive window 656 in the housing 655 allows the outgoing light beam from the scan head to exit and the incoming reflected light to enter. Other configurations of the stylus housing 655 are possible, for example the housing could be arranged to mount the scan head at a point on or near the tip and include an extensible writing instrument and/or extensible electronic stylus tip components.

The stylus, including the scan head, connects to the separate box 630 via a cable 657 which includes a multi-wire cable bundled together with the optical fiber(s). The separate box 630 is similar to the separate boxes in the embodiments of FIGS. 1 to 5, but box 630 also incorporates a writing tablet 632. The writing tablet is sensitive to contact or pointing of the stylus tip at positions on the tablet to derive positional data, and the tablet displays information related to the derived positional data. For example, the tablet may include an resistive contact type input screen, for electronically determining an X,Y position at which the pen tip contacts the tablet surface, and an associated display device, such as those disclosed in U.S. Pat. No. 4,972,496. Alternatively, the stylus electronics could rely on a light pen technology, on capacitive contact detection circuitry, pressure sensitive contact detection circuitry, ultrasonic proximity detection circuitry. etc. In each case, the key feature is that the stylus incorporates both the electronics necessary to provide X,Y position data input to the corresponding type of electronic tablet 632 and the scan head of the present invention.

Figure 6D:
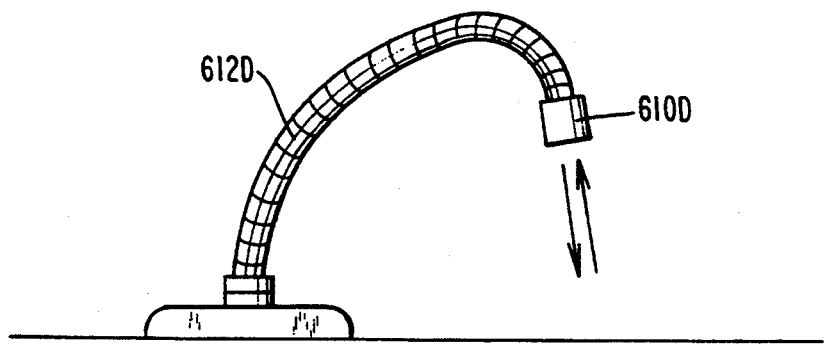

FIG. 6(D) shows use of the present invention in a gooseneck type scanner. In this embodiment a scan head 610A in accord with the present invention is mounted on the end of a flexible support arm 612D, which is similar in structure to the flexible support used in many types of desk lamp. The operator adjusts the curvature of the flexible support arm 612D to point the light emitting end of the scan head 610D down toward a point across which bar code labeled objects will pass. Typically, the optical fiber and the flexible multi-wire cable enter through the base of the support arm, pass through the flexible support arm 612D and connect to the scan head 610D in the manner described above with regard to FIGS. 1 to 5. One advantage to this embodiment is that the gooseneck scanner can be placed in relatively hostile environments, e.g. high temperature locations, and once set in position the operator need not physically manipulate the scan head during each scan operation performed in such an environment.

The various means used in the earlier embodiments to produce the oscillatory motion of the light emitted from the first or free end of the fiber may be replaced with purely mechanical means for producing the necessary scanning. FIGS. 8 to 11(C) show several structures for producing the motion by purely mechanical means. Such mechanical structures eliminate the need to supply drive current to an electromagnetic coil or a piezoelectric element in the scan head. This further simplifies and lightens the structure of the scan head and reduces the number of electrical leads bundled into the connecting cable. The separate unit is essentially the same as in the earlier embodiments, except that the drive signal generator has been eliminated.

Figure 8:
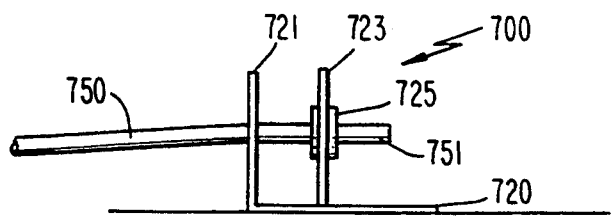
FIG. 8 is a side elevational view of a fiber mounting structure permitting mechanical vibration of the free end of the fiber in response to motion of the scanning head in a further embodiment of the invention.

FIG. 8 shows a first mechanical system 700 for producing the oscillatory motion of the light emitted from the first or free end 751 of the fiber 750. A lens (not shown) may be formed on or attached to the actual light emitting surface of the first end 751 of the optical fiber, to provide focusing of the scanning beam at an appropriate range from the scan head.

In this embodiment, the scan head would include a bracket structure having a lower horizontal section 720 fixed within the scan head. The bracket also has two vertical sections 721, 723. A point on the fiber 750 at a distance from the free end 751 is fixed to the first vertical section 721 of the bracket. At a point nearer the free end, the fiber passes through a moveable plastic bushing 725. The bushing 725 is moveable along a straight slot 727 formed in the second vertical portion 723 of the bracket (FIG. 9(A). The bushing and slot arrangement limits the motion of the free end of the fiber to a predetermined pattern so that the emitted light will produce a desired scanning pattern across the surface on which the indicia appears. Specifically, the slot 727 and bushing 725 permit horizontal motion of the free end 751 of the optical fiber 750 but prevent motion of the free end in a vertical direction. Consequently, motion of the bushing 725 and the free end 751 of the fiber will produce an accurate horizontal line scanning pattern.

Figure 9A:
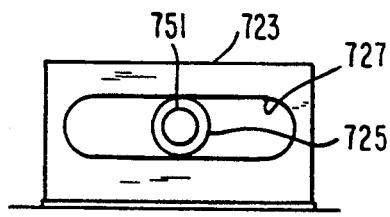
FIG. 9(A) is a front elevational view of one embodiment of the support structure of FIG. 8.

In the embodiment of FIG. 9(A) the end of the fiber beyond the fixed point acts as a spring which constantly biases the light emitting first or free end 751 of the fiber 750 to the rest position shown in the drawing. The operator sets the end 751 of the fiber 750 in motion by simply shaking or striking the scan head. The free end 751 will move away from the rest position temporarily storing some of the mechanical energy of imparted by the operator as spring energy within the spring formed by the fiber itself. As the energy is released, the spring vibrates in a damped manner, and the free end 751 of the fiber will oscillate or swing horizontally back and forth a number of times. The length of the oscillations of the free end will decrease progressively as the energy dissipates and the oscillation damps out. Thus, the free end gradually returns to the central rest position shown in the drawing.

If a surface carrying an indicia to be read were positioned to the right of the arrangement 700 in FIG. 8, the laser beam emitted from the vibrating free first end 751 of the fiber 750 would produce a horizontal scan line across that surface, anti the scanning line would extend substantially in and out of the plane of the figure. The operator would hold the scan head at a distance from the surface such that at least one of the oscillations of the free end 751 of the fiber would produce a scan line extending entirely across the indicia to permit reading thereof. When the operator shakes the scan head, the resultant scan line would initially extend entirely across the indicia. As the spring vibrations damp out and the free end oscillates over decreasing distances, the length of the scan line will decrease. The line, however, will extend across the indicia for one or more initial oscillations which will be sufficient to obtain a reading of the indicia.

Figure 9B:
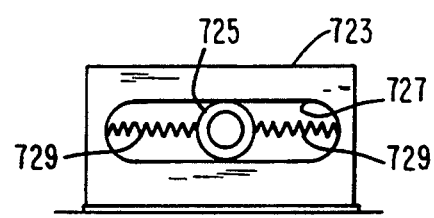
FIG. 9(B) is a front elevational view of a second embodiment of the support structure of FIG. 8.

In the embodiment of FIG. 9(A) the only spring provided was the spring formed by the portion of the fiber 750 which extends beyond the point fixed in vertical bracket section 721 to the free end 751. As shown in FIG. 9(B), additional springs 729 can be inserted between the bushing 725 and the opposite ends of the slot 727 to provide additional biasing forces urging the first or free end 751 towards the rest position. The added springs 729 increase the spring tension and limit the extremes of oscillation of the bushing 725 and the free end 751 of the fiber. The embodiment of FIG. 9(B) operates essentially in the same manner as the embodiment of FIG. 9(A).

The embodiment of FIG. 8 may use other bracket arrangements so long as a portion of the fiber 750 at a distance from the first end is fixed with respect to the scan head such that the first end 751 of the fiber can flex like a spring. Also, other means may be used to limit the direction of motion of the free first end 751 of the fiber and/or to guide the first end of the fiber to vibrate in a desired pattern. For example, instead of a guide slot and bushing arrangement, the system might include a second fiber vertically aligned with and attached to the fiber 750, similar to the arrangement shown in FIG. 5 (but without the magnet between the fibers). The fiber pair would only flex horizontally. If additional springs were desired, they could be located between the fiber pair and each opposite sidewall of the scan head housing.

The embodiments of FIGS. 8 to 9(B) can be used in a variety of housing configurations, but configurations wherein the scan head is handheld or worn or mounted on the arm or wrist are preferred. For example, the arrangement of FIG. 8 might form part of wrist mounted unit (FIG. 6(A)), a ring mounted scan head (FIG. 6(B)), a stylus unit (FIG. 6C), etc.

Figure 10:
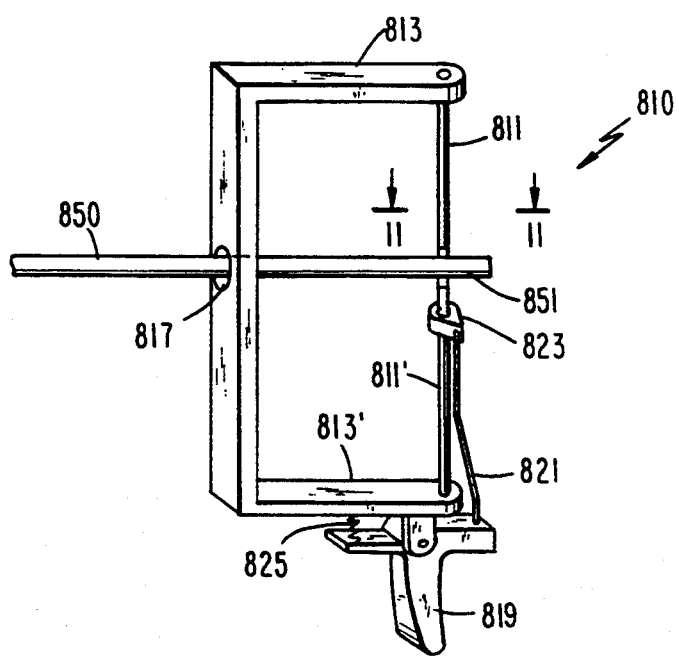
FIG. 10 is an isometric view of a system using a torsion spring arrangement for producing vibration of the free end of the fiber in response to activation of a trigger in another embodiment of the invention.

FIG. 10 shows an arrangement 810 using torsion wire springs to provide oscillatory motion of the free end of the fiber carrying light from the emitter in the separate housing unit. Again, a lens may be attached to or formed on the actual light emitting surface of the first end of the fiber. This embodiment includes a generally C-shaped bracket having an upper arm 813 and a lower arm 813′, although other bracket shapes or mounting structures can be used. The fiber 850 passes through an opening 817 approximately in the center of the vertical section of the C-shaped bracket. The opening 817 is somewhat larger than the fiber 850 to permit front to back motion and some twisting of the fiber 850 during oscillation of the free end 851 of the fiber.

An elongated torsion wire spring 811 is fixedly attached to and extends down from the upper arm 813. Another elongated torsion wire spring 811′ is fixedly attached to and extends up from the lower arm 813′. The free end 851 of the fiber 850 is secured between the free ends of the torsion wire springs 811, 811′.

A trigger 819 is pivotally attached to the lower arm 813′ of the C-shaped bracket. A spring 825 positioned between the lower arm 813′ and an extension of the trigger 819 provides a return force to automatically move the trigger 819 back to the rest or off position shown in the drawings, after the user has pulled and released the trigger.

One end of an actuator rod 821 connects to a forward projection of the trigger 819, consequently the actuator rods moves together with the trigger when an operator activates the trigger. An opposite driving end of the actuator rod 821 engages a tapered surface of a cam 823, when the trigger is in the off position.

The cam 823 is attached to the lower torsion wire spring 811′. The cam has a circular section and an integral, generally triangular shaped tapered section which terminates radially in a slightly rounded tip. The cam could also be mounted on the side of the fiber or on the upper torsion wire spring 811.

The embodiment of FIG. 10 would also include a microswitch or the like (not shown) which would respond to activation of the trigger to provide a signal to the separate housing unit to turn on the light emitter and the associated detector and processing circuitry. To initiate scanning, an operator pulls the trigger 819 from right to left in FIG. 10. The trigger pivots about the pin attaching it to the arm 813'. This motion of the trigger compresses the return spring 825 and moves the driving end of the actuator rod 821 from its rest position shown in FIG. 10 to a position to the right. As the driving end of the actuator rod 821 moves to the right, it engages the tapered surface of the cam 823 causing the cam to rotate. The cam rotates until it reaches a launch position at which the driving end of the actuator rod 821 slips past the rounded tip of the cam. The rotation of the cam to the launch position in response to the motion of the actuator rod 821 twists the torsion wire springs 811, 811' storing spring forces therein. At the launch position where the driving end of the actuator rod 821 moves past the tip of the cam, the cam and the torsion wire springs are released suddenly. The sudden release of the spring energy stored in the torsion wire springs 811, 811' produces a rotational spring vibration starting from the launch position.

Figure 11A:
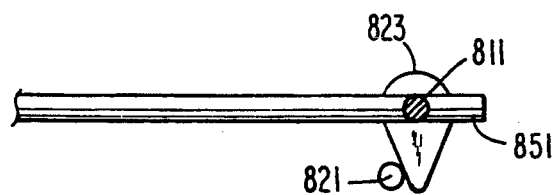
FIGS. 11(A) to 11(C) are sectional views taken along line A—A of FIG. 10 showing different positions of the cam and fiber during movement of the trigger.
Figure 11B:
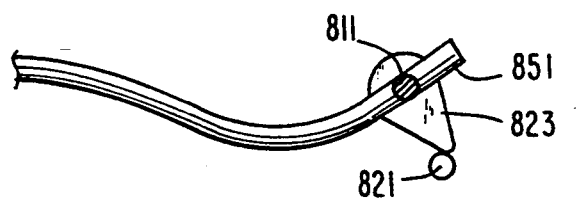
Figure 11C:
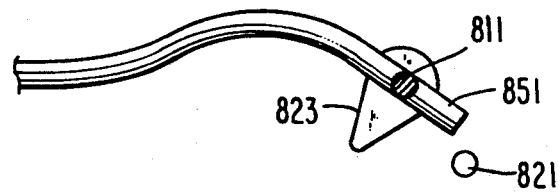

Since the free end 851 of the fiber 850 is attached between the torsion wire springs 811, 811', the free end rotates in response to the pressure of the driving end of the actuator rod 821 on the cam 823 and oscillates due to the rotational vibration of the springs 811, 811' when the driving end of the actuator rod 821 releases the cam 823. The free end of the fiber moves back and forth with the vibrations of the torsion wire springs through arc distances of progressively smaller amplitude until the spring energy dissipates and the free end 851 returns to and halts in the rest position. FIGS. 11(A) to 11(C) illustrate the positions of the driving end of the actuator rod 821, the cam 823 and the free end 851 at different times during such operation of the embodiment of FIG. 10.

Specifically, FIG. 11(A) shows the position of the actuator rod 821, the cam 823 and the free end 851 of the fiber 850 in their respective rest positions when the operator has not yet pulled the trigger. FIG. 11(B) shows the position of the actuator rod 821, the cam 823 and the free end 851 of the fiber 850 as the trigger is partially pulled, just before the drive end of the actuator rod 821 slips past the tip of the cam 823. At this point, the free end 851 of the fiber is close to or at the extreme point of its motion which will be the "launch" point or position from which oscillation due to the spring forces begins. As the actuator rod 821 slips past the tip of the cam 823 to the position thereof shown in FIG. 11(C), the spring energy stored in the torsion wire springs 811 and 811' is abruptly released causing the cam 823 and the free end 851 of the fiber 850 to rotate back towards and past the rest position to an extreme motion point in the opposite direction as shown in the drawing. The springs will then produce a damped oscillation of the free end of the fiber between the extreme positions thereof illustrated in FIGS. 11(B) and 11(C). As the oscillation damps out, the cam, springs and free end of the fiber will return to the rest positions of those components illustrated in Figure and 11(A).

When the user releases the trigger 819, the spring 825 will return the trigger and the attached actuator rod 821 toward their respective rest positions. The release motion of the rod 821 will again actuate the cam 823 causing another cycle of vibration of the springs 811, 811' and oscillation of the free end 851 of the fiber. When the spring energies in the torsion wire springs 811, 811' and in the return spring 825 have all dissipated, vibration and oscillation cease and all components return to the rest positions illustrated in FIG. 10.

The mounting of the free end 851 of the fiber 850 between the torsion wire springs 811, 811' prevents any vertical motion of the free end of the fiber. The spring driven oscillation of the free end 851 of the fiber 850 therefore will produce an accurate horizontal line scanning pattern.

When the operator pulls the trigger, the associated microswitch activates the laser emitter in the separate housing to transmit the beam through the fiber 850. The trigger action also initiates oscillation of the free end 851 of the fiber 850 as discussed above. The free end fiber will oscillate horizontally a number of times and slowly return to the central rest position shown in that drawing. If a surface carrying an indicia to be read were located to the right of the arrangement 810 shown in FIG. 10, the laser beam emitted from the vibrating free first end 851 of the fiber 850 would produce a horizontal scan line across that surface, and the scanning line would extend substantially in and out of the plane of the figure. The operator would hold the scan head containing arrangement 810 at a distance from the surface such that at least one of the oscillations of the free end 851 of the fiber would produce a scan line extending entirely across the indicia, to permit reading thereof.

The torsion wire springs 811, 811' may be replaced with other torsion spring elements. For example, each spring may be replaced with a flexible plastic element, such as a flat segment of Mylar ™ or Kapton ™ film. Alteratively, the two springs 811, 811' may be replaced with a single continuous wire or a single continuous Mylar ™ or Kapton ™ film strip similar to element 311 shown in FIG. 3.

Figure 7:
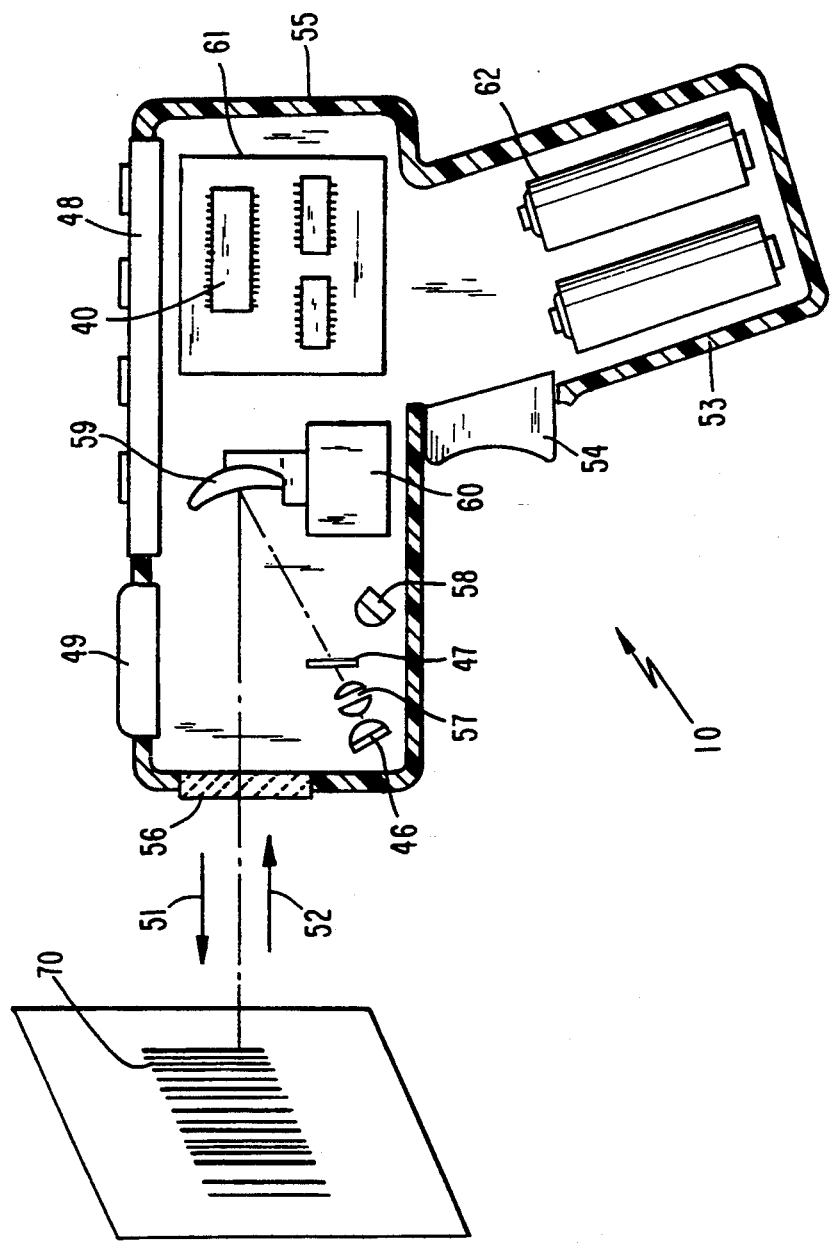
FIG. 7 illustrates a prior art handheld laser scanner and terminal device for scanning bar codes and inputting and displaying data.

The embodiments of FIG. 10 to 11(C) can be used in a variety of housing configurations. Preferably, the scan unit housing would have a pistol shape such as that of the prior art shown in FIG. 7, albeit somewhat smaller than the prior art housing. When other housing configurations are used, such as the wrist or ring mount units (FIGS. 6(A), 6(B)), the stylus unit (FIG. 6(C)) or the gooseneck unit (FIG. 6(D)), the bracket and/or the trigger 819 would be modified to allow enclosure in the appropriate housing and to permit the operator to easily activate the trigger.

Figure 12:
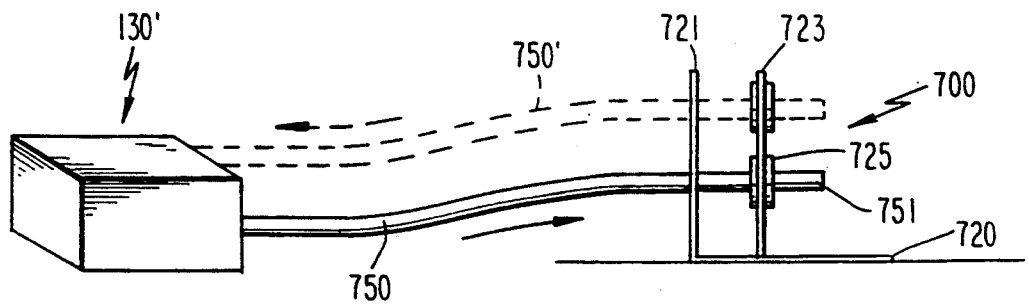
FIG. 12 is a diagram showing an embodiment of an optical scanning system combining a separate housing unit similar to that of FIG. 1 with the scan head of FIGS. 8 and 9 in accordance with the invention.

FIG. 12 depicts an embodiment of the scanning system according to the present invention which combines a separate housing 130', which is similar to the separate housing 130 of FIG. 1, with the scan head of FIGS. 8 and 9(A) or 9(B). Elements included in the FIG. 12 embodiment which are identical to those described in FIGS. 1 and 8 are identified with like reference numerals and will not be further described in order to avoid unnecessary duplication. As shown, the optical fiber 750 connects the separate housing 130' with the mechanical scan mechanism of FIG. 8. Separate housing 130' is identical to separate housing 130 except that separate housing 130' excludes the drive signal generator 147 which is included in housing 130 to drive the coil element 115 of FIG. 1. Because the FIG. 12 embodiment utilizes the purely mechanical scanning mechanism 700, the drive signal generator 147 is not required. Further, because no drive current is required by the scan mechanism 700, the cable needed to carry a drive current from the separate housing 130 to the coil element 115 in the FIG. 1 embodiment is also eliminated from the FIG. 12 embodiment.

As shown in FIG. 12, the system optionally includes a second optical fiber 750' for transmitting reflected light to the separate housing 130'. Optical fiber 750' is mechanically oscillated in a manner which is identical to the manner in which optical fiber 750 is oscillated, and functions identically to optical fiber 550' of FIG. 5. Alternatively, an optical sensor could be located in the scanner housing and electric signals generated thereby transmitted to the separate housing 130' by a wire as shown in FIG. 1.

Figure 13:
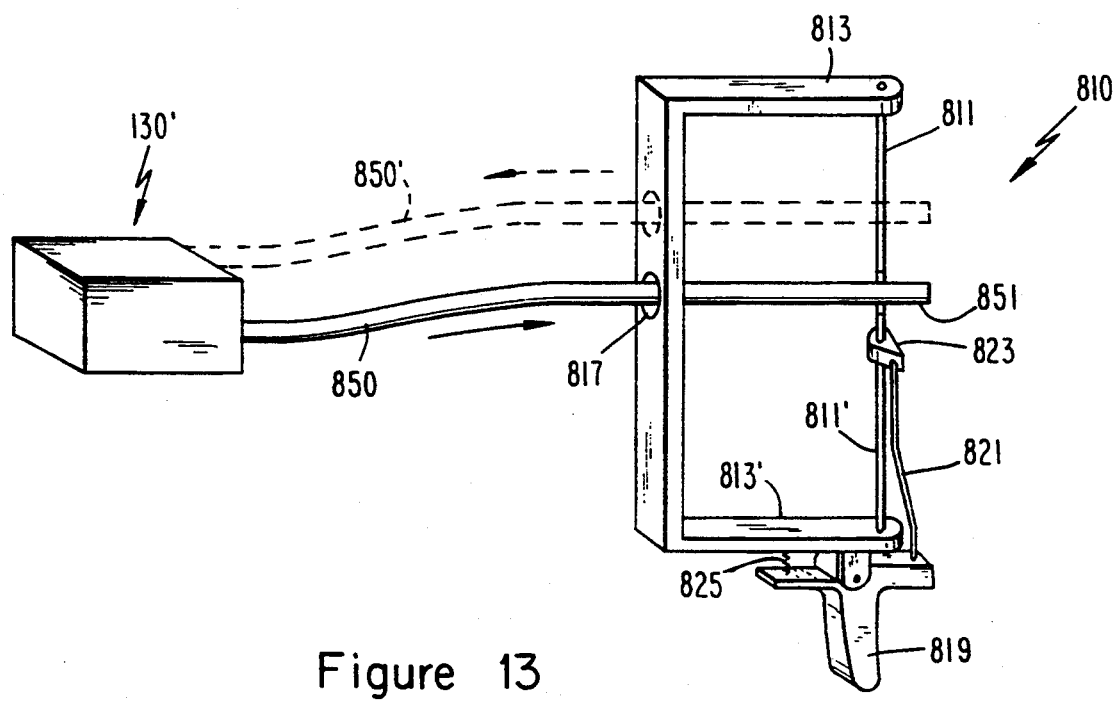
FIG. 13 is a diagram showing an embodiment of an optical scanning system combining the separate housing unit of FIG. 12 and the scan head of FIGS. 10 and 11 in accordance with the invention.

FIG. 13 depicts an embodiment of the scanning system according to the present invention which combines the separate housing 130' of FIG. 12, with the scan head of FIGS. 10 and 11. Elements included in the FIG. 13 embodiment which are identical to those described in FIGS. 10–12 are identified with like reference numerals and will not be further described in order to avoid unnecessary duplication. As shown, the optical fiber 850 connects the separate housing 130' with the mechanical scan mechanism of FIGS. 10 and 11. As noted in the description of the FIG. 12 embodiment, separate housing 130' is identical to separate housing 130 of FIG. 1, except that separate housing 130' does not include the drive signal generator 147 which is housed in housing 130 to drive the coil element 415 of FIG. 1. Once again, because the FIG. 13 embodiment utilizes the purely mechanical scanning mechanism 810, the drive signal generator 147 is not required. Further, because no drive current is required by the scan mechanism 810, the cable needed to carry a drive current from the separate housing 130 to the coil element 415 in the FIG. 1 embodiment is also eliminated from the FIG. 13 embodiment.

The FIG. 13 embodiment also optionally includes a second optical fiber 850' for transmitting reflected light to the separate housing 130'. Optical fiber 850' is mechanically oscillated in a manner which is identical to the manner in which optical fiber 850 is oscillated, and functions identically to optical fiber 550' of FIG. 5. Alternatively, an optical sensor could be located in the scanner housing and electric signals generated thereby transmitted to the separate housing 130' by a wire as shown in FIG. 1.

Figure 14:
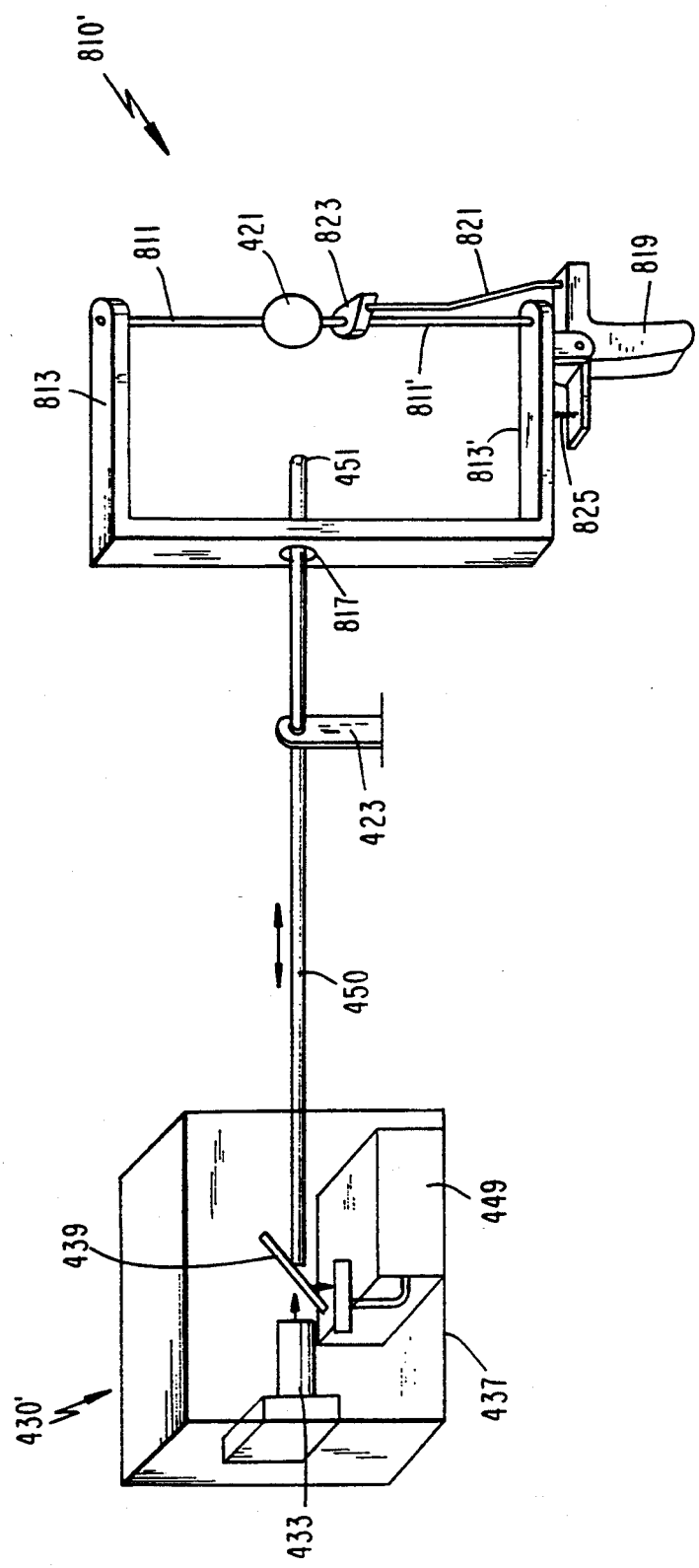
FIG. 14 is a diagram showing an embodiment of an optical scanning system combining a separate housing unit similar to that of FIG. 4 and a scan head similar to that of FIGS. 10 and 11 in accordance with the invention.

FIG. 14 depicts an embodiment of the scanning system according to the present invention which combines a separate housing similar to separate housing 430 of FIG. 4, with a scan head similar to that of FIGS. 10 and 11. Elements included in the FIG. 14 embodiment which are identical to those described in FIGS. 4 and 10–11 are identified with like reference numerals and will not be further described in order to avoid unnecessary duplication. As shown, the optical fiber 450 connects the separate housing 430' with a mechanical scan mechanism similar to that of FIG. 10. Separate housing 430' is identical to separate housing 430 of FIG. 4, but does not include a drive current generator to drive the coil 415 of FIG. 4. Because the FIG. 14 embodiment utilizes the purely mechanical scanning mechanism 810', a drive current generator is not required. Further, because no drive current is required by the scan mechanism 810', the cable needed to carry a drive current from the separate housing 430 to the coil 415 in the FIG. 4 embodiment is also eliminated from the FIG. 14 embodiment. The scanning mechanism 810' differs from the scanning mechanism 810 of FIG. 10 only in that, rather than the free end of the optical fiber 851 being oscillated by the scanning mechanism 810 as shown in the FIG. 10 embodiment, the mechanical scan mechanism 810' of FIG. 14 oscillates a lens 421, which is identical to the lens described with reference to FIG. 4. Except for this difference, it will be understood that scan mechanism 810' is identical to scan mechanism 810. Lens 421 functions as described in FIG. 4 to produce the scan and, if desired, collect the reflected light.

Figure 15:
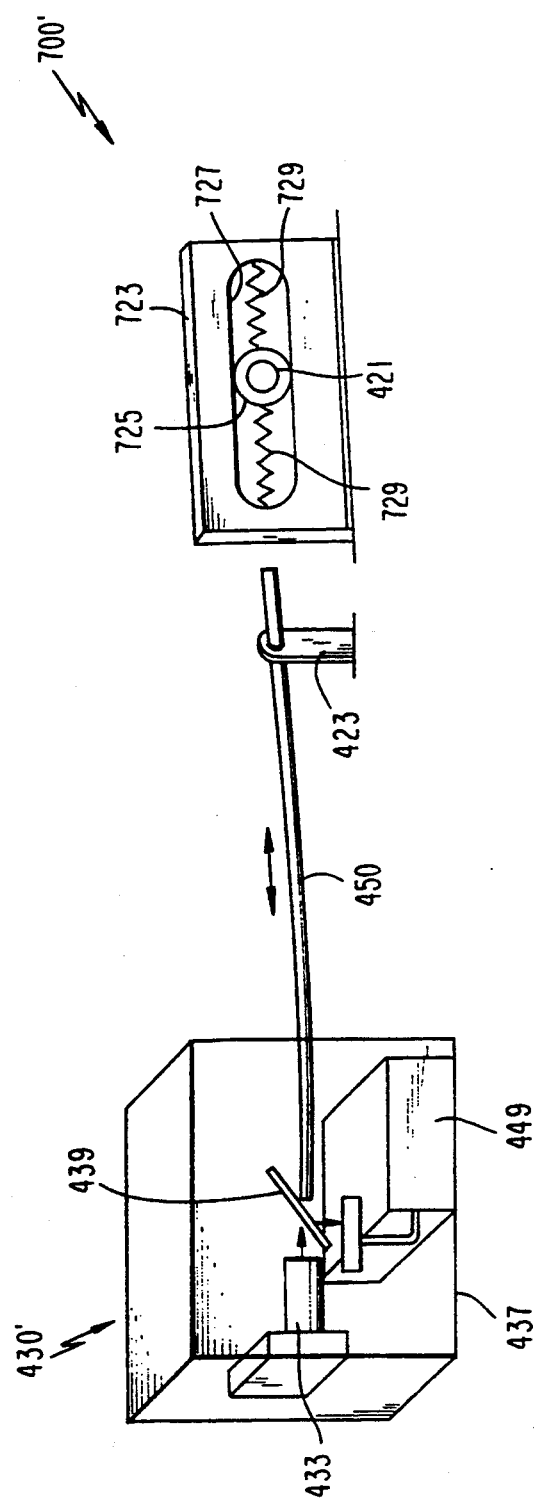
FIG. 15 is a diagram showing an embodiment of an optical scanning system combining the separate housing unit of FIG. 14 and a scan head similar to that of FIGS. 8 and 9(B) in accordance with the invention.

FIG. 15 depicts an embodiment of the scanning system according to the present invention which combines a separate housing which is identical to separate housing 430' of FIG. 14, with a scan mechanism 700' similar to scan mechanism 700 of FIGS. 8 and 9(B). Elements included in the FIG. 15 embodiment which are identical to those described in FIGS. 14 and 8 and 9(B) are identified with like reference numerals and will not be further described in order to avoid unnecessary duplication. As shown, the optical fiber 450 connects the separate housing 430' with a mechanical scan mechanism 700' similar to mechanism 700 of FIGS. 8 and 9(B). As noted above, separate housing 430' is identical to separate housing 430 of FIG. 4, except it does not include a drive current generator. Once again, because the FIG. 15 embodiment utilizes the purely mechanical scanning mechanism, a drive current generator is not required. Further, because no drive current is required by the scan mechanism 700', the cable needed to carry a drive current from the separate housing 430 to the coil 415 in the FIG. 4 is also eliminated from the FIG. 15 embodiment. The scanning mechanism 700' differs from the scanning mechanism 700 only in that, rather than the free end of the optical fiber 751 being oscillated by the scanning mechanism 700 as shown in the FIGS. 8 and 9(B) embodiment, FIG. 14 shows a lens 421, which is identical to the lens described with reference to the FIG. 4 embodiment, oscillated by the mechanical scan mechanism 700'. Except for this difference, it will be understood that scan mechanism 700' is identical to scan mechanism 700 of FIGS. 8 and 9(B). Lens 421 functions as described in FIG. 4 to produce the scan and, if desired, collect the reflected light.

In any of the mechanical scanning embodiments of FIGS. 8 to 15, the scan head may include a photodetector and operate in a manner similar to the embodiment of FIG. 1, or the fiber may carry both the laser beam to the scan head and the reflected light from the scan head back to the processing circuitry in the separate housing unit as in the embodiment of FIG. 4. Alternatively, additional fibers may be provided to carry the reflected light back to the separate housing unit, for example a bundle of fibers as in FIG. 3 or a single return fiber the end of which is vertically aligned with the transmission fiber as in FIG. 5.

Although movement of the first end of the fiber is preferred in the embodiments of FIG. 8 to 15, it is also possible to fixedly mount the first end of the fiber within the scan head and movably mount another component for producing the beam scanning motion, such as a lens as in FIG. 4.

From the above detailed description of the presently preferred embodiments, it should be clear that the invention reduces the size and weight of the scan head unit by moving as many components as possible to a separate housing unit. One or more optical fibers carry light from the laser diode to the scan head unit. The scan head, because it no longer contains the temperature sensitive laser diode, can also operate in more hostile environments. In some embodiments, the invention also moves the detector to the separate box and uses an optical fiber to carry light reflected by scanned symbols from the scan head back to the detector in the separate housing unit. The different systems for producing the scanning motion of the beam further facilitate reductions in size and weight. The invention thus produces a scanning system which is convenient to carry and operate and is particularly robust.

What is claimed is:

1. A system for scanning an indicia, comprising:
   an optical scan unit;
   a separate unit spaced apart from the optical scan unit;
   a light emitter contained in the separate unit;
   an optical fiber, a first end of which is mounted within the optical scan unit and a second end of which connects to the separate unit, said optical fiber carrying light from the emitter to the optical scan unit such that the light emerges from the first end of the fiber for purposes of scanning said indicia; and
   means for fixedly attaching a portion of the fiber at a distance from the first end of the fiber to the optical scan unit such that the first end is free to vibrate with respect to the optical scan unit in response to a mechanical force applied by a user to cause the light emerging from the first end of the fiber to scan back and forth across said indicia.

2. A system as in claim 1, further comprising:
   an optical detector for sensing light reflected from the indicia; and
   processing circuitry, contained within said separate unit, for analyzing signals from the optical detector to determine characteristics of the indicia.

3. A system as in claim 2, wherein said optical detector is mounted in said optical scan unit, said system further comprising a flexible cable carrying the signals from the optical detector from the optical scan unit to the circuitry for analyzing signals within the separate unit.

4. A system as in claim 2, wherein said optical detector is contained within said separate unit.

5. A system as in claim 4, wherein an optical fiber carries light reflected from the indicia from the optical scan unit to the optical detector within said separate unit.

6. A system as in claim 5, wherein the optical fiber carrying the light from the emitter also carries the light reflected from the indicia from the optical scan unit to the optical detector within said separate unit and only a single optical fiber within said system carries light from said emitter and reflected light from said indicia.

7. A system as in claim 5, wherein the optical fiber carrying the light from the emitter is a first optical fiber, and the fiber which carries the light reflected from the indicia from the optical scan unit to the optical detector within said separate unit is a second fiber separate from said first fiber.

8. A system according to claim 5, further comprising a beam splitter, and wherein:
   the optical fiber carrying the light from the emitter also carries the light reflected off the indicia from the optical scan unit to the optical detector, and
   said beam splitter (i) receives light directly from the emitter and couples said emitted light to said optical fiber, and (ii) applies light reflected from said indicia and received from said optic fiber directly to said optical detector.

9. A system as in claim 1, further comprising means for mounting the optical scan unit on an arm, wrist or finger of a user.

10. A system as in claim 1, further comprising a pen or stylus type housing containing the optical scan unit.

11. A system as in claim 1, further comprising means for limiting motion of the first end of the fiber to a predetermined pattern so that the light emerging from the first end of the fiber will produce a desired scanning pattern across the indicia.

12. A system as in claim 11, wherein the desired scanning pattern is linear.

13. A system as in claim 12, wherein the means for limiting motion comprises: a bushing attached to the first end of the fiber; and a straight slot within which the bushing is free to move.

14. A system as in claim 13, further comprising two springs each of which is positioned within the slot between the bushing and one opposite end of the slot.

15. A system according to claim 1, wherein the first end of the fiber extends from the attachment means and floats so as to be capable of vibration independently of the attaching means.

16. A system for scanning indicia, comprising:
    an optical scan unit;
    a separate unit spaced apart from the optical scan unit;
    a light emitter contained in the separate unit;
    an optical fiber, a first end of which connects to the optical scan unit and a second end of which connects to the separate unit, said optical fiber carrying light from the emitter to the optical scan unit; and
    means within the optical scan unit for producing oscillatory movement of light emerging from the first end of said optical fiber for scanning optically encoded indicia, wherein said means for producing oscillatory movement comprises:
    (i) a torsion spring flexibly mounting the first end of said optical fiber within said optical scan unit for oscillatory motion; and
    (ii) mechanical means responsive to activation by a user for storing spring energy in the torsion spring and abruptly releasing said spring energy to initiate vibration of the torsion spring and oscillation of the first end of said optical fiber.

17. A system as in claim 16, further comprising:
    an optical detector for sensing light reflected from the indicia; and
    processing circuitry, contained within said separate unit, for analyzing signals from the optical detector to determine characteristics of the indicia.

18. A system as in claim 17, wherein said optical detector is mounted in said optical scan unit, said system further comprising a flexible cable carrying the signals from the optical detector from the optical scan unit to the circuitry for analyzing signals within the separate unit.

19. A system as in claim 17, wherein said optical detector is contained within said separate unit.

20. A system as in claim 19, wherein an optical fiber carries light reflected from the indicia from the optical scan unit to the optical detector within said separate unit.

21. A system as in claim 20, wherein the optical fiber carrying the light from the emitter also carries the light reflected from the indicia from the optical scan unit to the optical detector within said separate unit.

22. A system as in claim 20, wherein the optical fiber carrying the light from the emitter is a first optical fiber, and the fiber which carries the light reflected from the indicia from the optical scan unit to the optical detector within said separate unit is a second fiber separate from said first fiber.

23. A system as in claim 16, wherein the mechanical means responsive to activation by a user for storing spring energy in the torsion wire spring comprises:
a cam coupled to the torsion spring; and
actuator means for applying a force to said cam in response to the activation by the user causing said cam to twist said torsion spring.

24. A system as in claim 23, further comprising a trigger, wherein said actuator means are attached to said trigger and apply force to said cam and then abruptly release the cam, as the user moves the trigger.

25. A system for scanning an indicia, comprising:
an optical scan unit;
a separate unit spaced apart from the optical scan unit;
a light emitter contained in the separate unit;
an optical fiber, a first end of which is mounted within the optical scan unit and a second end of which connects to the separate unit, said optical fiber carrying light from the emitter to the optical scan unit such that the light emerges from the first end of the fiber for purposes of scanning said indicia;
means for movably mounting a transparent optical component with respect to the optical scan unit, the optical component directing the light emerging from the first end of the fiber toward said indicia;
means for vibrating the optical component in response to a purely mechanical force applied by an operator, to produce oscillatory motion of the light emerging from the first end of said optical fiber back and forth across said indicia;
an optical detector for sensing light reflected from the optically encoded indicia; and
processing circuitry, contained in the separate unit, for analyzing signals from the optical detector to determine characteristics of the indicia.

26. A system as in claim 25, wherein said means for vibrating the optical component includes either (i) a slot within which the optical component is free to move and two springs each positioned between said optical component and a respective edge of the slot or (ii) a torsion spring flexible mounting the optical component and mechanical means responsive to activation by the operator for storing spring energy in the torsion spring and abruptly releasing said spring energy to initiate vibration of the torsion spring and thereby oscillate the optical component.

27. A system according to claim 25, wherein said optical component is an optical lens.

28. A method of scanning indicia having portions of different light reflectivity, comprising the steps of:
directing light through an optical fiber to emerge from a movably mounted free end of the fiber;
directing the light which emerges from the free end of the fiber toward indicia;
constantly exerting a biasing force on the free end of the fiber to bias the free end of the fiber to a rest position;
manually moving the free end of the fiber away from the rest position against said biasing force and concomitantly storing spring energy;
using the stored spring energy to move the free end back and forth and guide the light emerging from the free end over swing distances of progressively smaller lengths until the free end of the fiber returns to and halts in the rest position, at least one swing distance being sufficiently long that the light emerging from the free end of the fiber moves entirely across the indicia; and
detecting light reflected off the portions of the indicia of different light reflectivity during movement of the light emerging from the free end across the indicia, to determine characteristics of the indicia.

29. A method as in claim 28, wherein:
a point on the fiber at a distance from the free end is fixed with respect to an optical scan unit such that a portion of the fiber between the fixed point and the free end forms a flexible spring for exerting the biasing force on the free end of the fiber; and
the step of manually moving the free end away from the rest position comprises the step of shaking or striking on the optical scan unit.

30. A method as in claim 28, wherein:
the free end of the fiber is attached to a rotatable end of a torsion spring which exerts the biasing force on the free end of the fiber; and
the step of manually moving the free end away from the rest position comprises twisting the torsion spring to concomitantly store rotational spring energy therein.

31. A method as in claim 28, wherein:
the step of manually moving the free end away from the rest position comprises the step of moving the free end to a launch point; and
the step of using the stored spring energy comprises the step of abruptly releasing the stored spring energy.

32. A method as in claim 28, wherein the step of manually moving the free end away from the rest position is performed by a single exertion of mechanical power by an operator.

33. A method as in claim 28, wherein the step of manually moving the free end away from the rest position is performed by a single pull on a trigger.

* * * * *